United States Patent
James et al.

(10) Patent No.: US 11,565,212 B2
(45) Date of Patent: Jan. 31, 2023

(54) POROUS LIQUIDS

(71) Applicant: The Queen's University of Belfast, Belfast (GB)

(72) Inventors: Stuart James, Belfast (GB); Min Ying Tsang, Belfast (GB); John Cahir, Belfast (GB); David Rooney, Belfast (GB)

(73) Assignee: The Queen's University of Belfast, Belfast (GB)

( * ) Notice: Subject to any disclaimer, the term of this patent is extended or adjusted under 35 U.S.C. 154(b) by 0 days.

(21) Appl. No.: 16/611,774

(22) PCT Filed: May 11, 2018

(86) PCT No.: PCT/GB2018/051279
§ 371 (c)(1),
(2) Date: Nov. 7, 2019

(87) PCT Pub. No.: WO2018/206977
PCT Pub. Date: Nov. 15, 2018

(65) Prior Publication Data
US 2020/0330919 A1 Oct. 22, 2020

(30) Foreign Application Priority Data
May 12, 2017 (GB) .................. 1707674

(51) Int. Cl.
*B01J 20/22* (2006.01)
*B01J 20/18* (2006.01)
(Continued)

(52) U.S. Cl.
CPC ............. *B01D 53/10* (2013.01); *B01D 15/02* (2013.01); *B01D 53/025* (2013.01);
(Continued)

(58) Field of Classification Search
None
See application file for complete search history.

(56) References Cited

U.S. PATENT DOCUMENTS 5,075,023 A 12/1991 Fukuyama et al.
5,552,076 A * 9/1996 Gamota ............. C10M 171/001
252/78.3
(Continued)

FOREIGN PATENT DOCUMENTS

DE 102005023857 A1 11/2006
EP 0372366 A1 6/1990
(Continued)

OTHER PUBLICATIONS

Safety Data Sheet for Paraffin Oil. Sigma-Aldrich (2014). Viewed on Feb. 22, 2022 at https://ehslegacy.unr.edu/msdsfiles/26640.pdf.*
(Continued)

*Primary Examiner* — Daniel Berns
(74) *Attorney, Agent, or Firm* — Henry Patent Law Firm PLLC

(57) ABSTRACT

The invention relates to dispersions of porous solids in liquids selected from deep eutectic solvents, liquid oligomers, bulky liquids, liquid polymers, silicone oils, halogenated oils, paraffin oils or triglyceride oils, as well as to their methods of preparation. In embodiments of the invention, the porous solids are metal organic framework materials (MOFs), zeolites, covalent organic frameworks (COFs), porous inorganic materials, Mobil Compositions of Matter (MCMs) or a porous carbon. The invention also relates to the use of porous materials to form dispersions, and to assemblages of such dispersions with a gas or gases. The dispersions can exhibit high gas capacities and selectivities.

5 Claims, 11 Drawing Sheets

(51) Int. Cl.
    *B01J 20/20* (2006.01)
    *B01D 53/10* (2006.01)
    *B01D 15/02* (2006.01)
    *B01D 53/02* (2006.01)
    *B01D 53/14* (2006.01)

(52) U.S. Cl.
    CPC .......... *B01D 53/1493* (2013.01); *B01J 20/18* (2013.01); *B01J 20/226* (2013.01); *B01D 53/1475* (2013.01); *B01D 2252/205* (2013.01); *B01D 2252/2023* (2013.01); *B01D 2252/2026* (2013.01); *B01D 2252/2028* (2013.01); *B01D 2253/102* (2013.01); *B01D 2253/108* (2013.01); *B01D 2253/202* (2013.01); *B01D 2253/204* (2013.01); *B01D 2256/245* (2013.01); *B01D 2257/102* (2013.01); *B01D 2257/504* (2013.01); *B01D 2257/7025* (2013.01); *B01J 20/205* (2013.01); *Y02C 20/20* (2013.01); *Y02C 20/40* (2020.08)

(56) References Cited

U.S. PATENT DOCUMENTS

| | | | |
|---|---|---|---|
| 6,107,433 A * | 8/2000 | Petrovic | C07D 303/42 528/1 |
| 6,540,936 B1 | 4/2003 | Takagi et al. | |
| 7,901,619 B2 | 3/2011 | Mueller et al. | |
| 2003/0050217 A1 | 3/2003 | Instone et al. | |
| 2013/0274087 A1 | 10/2013 | da Silva Pinto et al. | |
| 2014/0099245 A1 | 4/2014 | Hamad | |
| 2017/0173518 A1 | 6/2017 | Chen et al. | |

FOREIGN PATENT DOCUMENTS

| | | |
|---|---|---|
| GB | 2219598 A | 12/1989 |
| WO | WO-2010106133 A1 | 9/2010 |
| WO | WO-2012118434 A1 | 9/2012 |
| WO | WO-2015165143 A1 | 11/2015 |

OTHER PUBLICATIONS

Gomaa, H., et al. "Removal of Uranium from Acidic Solution Using Activated Carbon Impregnated with Tri Butyl Phosphate." Biol. Chem. Res. 2016 (2016): 313-340 (published Nov. 25, 2016).*

Howe, Patrick, International Search Report for PCT/GB2018/051279, dated Sep. 12, 2018, 7 pages.

Diestel, L., et al., "Comparative Permeation Studies on Three Supported Membranes: Pure ZIF-8, Pure Polymethylphenylsiloxane, and Mixed Matrix Membranes," Microporous and Mesoporous Materials, vol. 189, Sep. 21, 2013, pp. 210-215.

Klochko, B.N., et al., "Study of the Insulating Properties of Carbon Black in Suspensions Modelling Solid-Phase Composites Based on Phenolic Resins," International Polymer Science and Technology, Rapra Technology, vol. 24, No. 9, Jan. 1, 1997, pp. T95-T97.

Markarian, Nikolai, et al., "Particle Motions and Segregation in Dielectrophoretic Microfluidics," Journal of Applied Physics, American Institute of Physics, vol. 94, No. 6, Sep. 15, 2003, pp. 4160-4169.

Yot, Pascal G., et al.; "Mechanical energy storage performance of an aluminum fumarate metal—organic framework"; Chem. Sci., vol. 7; Oct. 5, 2015; pp. 446-450.

Giri, Nicola, et al.; "Liquids with permanent porosity"; Nature, vol. 527; Nov. 12, 2015; pp. 216-221.

Pei, Cuiying, et al.; "Great Prospects for PAF-1 and its derivatives"; Material Horizons, vol. 2, No. 1; Sep. 29, 2014; pp. 11-21.

\* cited by examiner

POROUS LIQUIDS

The present invention relates to dispersions of porous solids in liquids selected from deep eutectic solvents, liquid oligomers, bulky liquids, liquid polymers, silicone oils, halogenated oils, paraffin oils or triglyceride oils, as well as to their methods of preparation. In embodiments of the invention, the porous solids are metal organic framework materials (MOFs). The invention also relates to the use of porous materials to form dispersions, and to assemblages of such dispersions with a gas or gases. The dispersions can exhibit high gas capacities and selectivities.

Porous solids such as zeolites, activated carbon and metal-organic frameworks (MOFs) are useful in molecular separation due to their permanent porosity. Porous solid adsorbents have significant advantages, for instance in terms of lower energy penalties in adsorption-desorption cycles when compared with their liquid counterparts, but they are difficult to incorporate into conventional flow processes.

Liquid phases for the dissolution of gases are known. Solutions of various amines in water, or other solvents, are known to dissolve $CO_2$ and are applied industrially in natural gas "sweetening". However, these methodologies comprise the use of toxic materials; are corrosive towards steel, which limits their uses industrially; and require large amounts of energy to regenerate. They are also non-specific and therefore cannot be used for specific or targeted gas separation.

Porous liquids based on crown-ether cage molecules dissolved in organic solvents are known (Nature, 2015, 527, 216). However, their preparation involves several steps and highly specialised expertise, making them lack viability for commercial use. The use of volatile organic solvents in these porous liquids also limits their application in continuous/reversible gas dissolution methodologies, since the solvents evaporate under the reduced pressure conditions typically used to remove dissolved gases.

Accordingly, materials that could combine the fluid properties of liquids and the permanent porosity of solids would offer significant advantages when compared with existing technologies in the fields of molecular storage and separation. Materials that could be used in continuous/reversible gas dissolution would also be advantageous, particularly where the materials do not require significant amounts of energy to regenerate. Other potential advantages may include a reduction in complexity, ease of preparation, ready availability and lack of toxicity of starting materials.

SUMMARY OF THE INVENTION

According to the present invention there is provided a dispersion comprising a porous solid in a liquid selected from a deep eutectic solvent, a liquid oligomer, a bulky liquid, a liquid polymer, a silicone oil, a halogenated oil, a paraffin oil, a triglyceride oil or a combination thereof.

In some embodiments, the dispersion may comprise 0.1-50 wt % of the porous solid, more particularly 0.5-30 wt %. In particular embodiments, the dispersion may comprise 1-15 wt % of the porous solid. More particularly, the dispersion may comprise 2-140 wt % of the porous solid. In some embodiments, for example when the porous solid is a MOF, zeolite or activated carbon, the dispersion may comprise 11-14 wt % of the porous solid, more particularly 12-13 wt % of the porous solid.

Optionally, the porous solid is a MOF.

Generally, a dispersion is a system in which particles are dispersed in a continuous phase of a different composition. The term "dispersion" is used herein to relate to a system in which particles of a porous solid are dispersed in a liquid phase or medium. According to the invention, the liquid phase or medium is selected from the group consisting of silicone oils, halogenated oils, paraffin oils and triglyceride oils. The dispersion may optionally comprise additives, such as surfactants, in order to increase the stability of the dispersion. Such additives are known to those skilled in the art.

It is known that some dispersions are time dependent before the start of separation of the solid particles in the liquid phase or medium, possibly based on requiring some form of agitation to continue as a dispersion. The present invention is not limited to the stability or transience of the dispersion.

The inventors have surprisingly determined that a dispersion according to the invention has a greater capacity for a gas or gases, than the liquid per se.

The inventors have demonstrated that the measured uptake for various gases in the dispersions of the present invention correlate with the gas uptake for the porous solid and the liquid. This confirms that the liquid of the dispersion does not enter the pores of the porous material, leaving the pores available for adsorption of gases. The present invention can therefore provide a material in a liquid phase or liquid form having a "permanent porosity", a characteristic previously attributed only to solid materials. Such materials have use in the fields of, among others, gas separation and storage. Furthermore, as the measured uptake for various gases in a dispersion of the present invention has been found to correlate with theoretical gas uptake, the dispersion can be tailored to meet the application of interest.

In an embodiment, the porous solid is selected from a MOF, a zeolite, a covalent organic framework (COF), a porous inorganic material, a Mobil Composition of Matter (MCM) or a porous carbon. Porous solids can be microporous, in which a major part of the porosity results from pores with widths of less than 2 nm, or mesoporous, in which a major part of the porosity results from pores with widths between ~2 nm and 50 nm.

Zeolites and porous carbon are rigid, chemically stable, physically stable and low cost porous materials, which are widely used for purification and catalysis. They can therefore be used in the present invention to create dispersions with a wide range of applications. In particular, the zeolite may be zeolite 3A, zeolite 5A, zeolite 13X, zeolite Rho, zeolite AgX or zeolite AgA. More particularly, for $CO_2$ uptake the zeolite may be zeolite 3A or zeolite Rho. For $C_2H_4$ uptake, the zeolite may be zeolite AgA. For $C_2H_8$ uptake, the zeolite may be zeolite 13X. More particularly, for a dispersion comprising a zeolite the liquid may be a silicone oil or a triglyceride oil. In particular, the porous carbon may be activated carbon or graphite. More particularly, for a dispersion comprising an activated carbon the liquid may be polyethylene glycol.

In particular, the porous inorganic solid can be silica.

A covalent organic framework (COF), also sometimes referred to as a Porous Organic Polymer (POP), is a two-dimensional or three-dimensional organic solid. COFs are generally porous and crystalline. They are normally made from light elements. In particular, they may be made entirely from (ie they consist of) H, B, C, N and O. More particularly, the COF may be a porous aromatic framework, for example PAF-1. PAF-1 is a tetraphenylmethane polymer (see, for example, Mater. Horiz., 2015, 2, 11-21). As detailed in the examples below, the starting material for its preparation is tetrakis(4-bromophenyl)methane.

A Mobil Composition of Matter (MOM) is a further type or mesoporous material. In particular, the MCM may be a silicate. More particularly, the MCM may be MCM-41 or MCM-48. Structurally, these MCMs comprise an amorphous silica wall with a long range ordered framework and substantially uniform mesopores.

A metal-organic framework (commonly abbreviated to MOF) is a Co-ordination Polymer or Co-ordination Network with an open framework containing potential voids. MOFs are crystalline or non-crystalline, and are characterised by having particular pores or pore distributions and large specific surface areas. Current applications for MOFs include catalysis, separation and storage of a variety of chemical compounds and gases. Advantageously, MOFs can be modified in terms of porosity, functionality and selectivity, allowing them to be 'fine-tuned' to specific applications. Dispersions according to the present invention in which the porous solid is a MOF can therefore be tailored to the application of interest, providing designable dispersions or designable porous liquids.

MOFs comprise metal ions co-ordinated to organic linkers or inorganic anions. Suitable components for MOFs are listed in Table 1 below.

TABLE 1

| | Components of MOFs | | | |
|---|---|---|---|---|
| Organic Linkers | Carboxylates | Imidazoles | Heterocycles containing elements such as N, O, S, B, P | Sulfonates |
| | Phosphonates | peptides | Carboranes | polyoxometalates |
| | i) including mixtures of above mentioned linkers | | | |
| | ii) including derivatives of the above linkers with functional groups such as halogens, amines, alkyl groups, esters, ethers, silyl groups, acetylenes, hydroxyls, carboxyls, thio groups, azide groups, amides, aryl groups, alkenyl groups, alkynyl groups etc.) | | | |
| Metal ions | Alkaline | Transition metals | Lanthanide | Actinide |
| | Post-transition metals | | | |
| | i) including mixtures of the above mentioned metal ions | | | |
| | ii) including the corresponding metal clusters | | | |
| Linkers which are inorganic anions | $SiF_6$ | $TiF_6$ | oxalate | |

Suitable MOFs for use in the dispersions of the invention are shown in Table 2, below:

TABLE 2

| MOFs | | | | |
|---|---|---|---|---|
| MOF-5 | MOF-177 | MOF-74/CPO-27 | MOF-210 | MOF-505 |
| MOF-200 | MOF-253 | MOF-508 | IMOF-3 | MOF-4 |
| MOF-602 | MOF-603 | MOF-2 | Sod-ZMOF | Rho-ZMOF |
| MOF-205 | ZIF-14 | ZIF-65 | ZIF-25 | ZIF-10 |
| ZIF-93 | ZIF-97 | ZIF-11 | ZIF-12 | ZIF-3 |
| ZIF-22 | ZIF-20 | ZIF-21 | ZIF-9 | ZIF-23 |
| ZIF-90 | ZIF-71 | ZIF-78 | ZIF-68 | ZIF-81 |
| ZIF-82 | ZIF-96 | ZIF-79 | ZIF-70 | ZIF-95 |
| ZIF-69 | ZIF-100 | ZIF-6 | CPL-11 | CPL-2 |
| BIF-2Li | BIF-2Cu | BIF-9 | BIF-4 | BIF-10 |
| BIF-6 | BIF-7 | BIF-8 | BIF-3 | BIF-5 |
| TIF-1 | TIF-2 | TIF-5 | TIF-3 | TIF-4 |
| PCN-6 | PCN-14 | PCN-66 | PCN-12 | PCN-224 |
| PCN-9 | PCN-13 | PCN-17 | PCN-333 | PCN-225 |
| PCN-332 | PCN-250 | PCN-222 | PCN-61 | PCN-521 |
| PCN-46 | PCN-223 | UMCM-2 | UMCM-150 | UMCM-1 |
| MIL-53; MIL-53(Al) | MIL-100 | MIL-101 | MIL-96 | MIL-47 |
| MIL-102 | MIL-117; MIL-142A | MIL-141 | MIL-140 | MIL-88 |
| MIL-120 | MIL-84 | MIL-91 | SNU-25 | SNU-50' |
| SNU-15 | SNU-M10 | SNU-M11 | SNU-21S | SNU-21H |
| SNU-30 | SNU-3 | SNU-9 | SNU-21 | SNU-31' |
| DUT-10 | DUT-4 | DUT-51 | DUT-13 | DUT-6 |
| NOTT-100 | NOTT-140 | NOTT-140a | NOTT-107 | NOTT-109 |
| NOTT-300 | NOTT-116 | UMCM-150 | USO-2-Ni | USO-3-In |
| USO-1-Al-A | MSF-2 | Cu-BITri | ELM-11 | Ni-STA-12 |
| IRMOF-11 | IRMOF-6 | IRMOF-62 | IRMOF-3 | MOP-23 |
| Mn(pmdc) | Co(tlmb) | YO-MOF | Cd-ADA-1 | CdIF-9 |
| Cu-EBTC | $Zn_2$(BTetB) | $Cu_2$(bptb) | ELM-31 | NU-100 |
| NU-135 | NU-125 | NU-140 | NU-111 | NU-700 |
| Zn(3,5-pydc)(DMA) | $H_3(Cu_4Cl)_2(BTTri)_8$ | $Cu_2$(imta)(DMSO) | Co(dcdd) | $Co_4((OH)_2(dcdd)_3$ |
| $Cd_2(tzc)_2$ | $Mn(HCO_2)_2$ | $Cu_2I_2$(bttp4) | Cu(1,4-ndc) | Zn(bchp) |
| $Ni_2$(pbmp) | Zn(3,5-pydc)(DMA) | $Zn_4O$(bmpbdc)$_3$ | Cu-TDPAT | $Zn_2$(bdc)$_2$(dabco) |

TABLE 2-continued

| MOFs | | | | |
|---|---|---|---|---|
| UTSA-16 | UTSA-20 | UTSA-34 | UTSA-40 | UTSA-38 |
| UTSA-100 | UTSA-100a | ZJU-5 | ZJU-25 | ZJU-35 |
| Cu-TaTB-30 | CAU-L; CAU-10-H | UoC-1 | Co-BDP | MFU-4 |
| $Zn_4O(bfbpdc)_3$ | HNUST-2 | HNUST-3 | UiO-67 | Cu(fma) |
| $Cu_2(sdc)_2(ted)$ | $Cu_3(tatb)$ | $Cu_3(btb)$ | $Zn_4O(fma)_3$ | MTAF-4 |
| NPC-5 | NJFU-2 | MCM-41 | MAF-49 | MAF-2 |
| $CU_3(btc)_2$ | $Zn_4O(dmcapz)_2$ | FMOF-1 | FMOF-2 | $Co(dcdd)(py)_2$ |
| ELM-11 | $Zn_2(bmebdc)_2(pipy)$ | CUK-1 | CUK-2 | ZJNU-41 |
| ZJNU-42 | ZnCar.DMF | MPF-2 | MPF-9 | VSB-3 |
| bio-MOF-1 | bio-MOF-11 | HLJU-1 | HLJU-2 | IFMC-200 |
| NENU-3 | NENU-28 | NENU-29 | NENU-15 | NENU-11 |
| TMOF-1 | Cu-BTT | Ni-BTT | ITHD | NPC-5 |
| MOP-1 | BUT-10 | BUT-11 | SIFSIX-2-Cu | SIFSIX-2-Cu-i |
| ELM-11 | DO-MOF | oCB-MOF-1 | PCMOF-5 | CDMOF-2 | i) including isostructural MOFs with different metal ions and/or linkers

In an embodiment, the MOF is selected from HKUST-1, ZIF-8, A(fumarate)(OH), SIFSIX-3-Zn, SIFSIX-3-Cu, UiO-66-NH$_2$, UiO-66, Zr(fumarate), ZIF-67, MOF-5, IRMOF-3, UiO-67, CAU-10, SIFSIX-3-Ni, MIL-53, MIL-53(Al), MIL-101, NOTT-100, PCN-14, SIFSIX-3-Co, ZIF-90, ZIF-7, BIT-101, MOF-74, MOF-177, CuBTTri, IRMOF-3, MOF-5CH$_3$, PCN-222, and UiO-66-CH$_3$.

In an embodiment, the MOF is selected from HKUST-1, ZIF-7, ZIF-8, Al(fumarate)(OH), SIFSIX-3-Zn, SIFSIX-3-Cu, UiO-66-NH$_2$, UiO-66, Zr(fumarate), ZIF-90 and ZIF-67. The MOFs can be synthesized using methodologies known to the person skilled in the art, and are not further described herein. More particularly, for CO$_2$ uptake the MOF may be HKUST-1, Al(fumarate)(OH) and/or SIFSIX-3-Zn. For C$_2$HN uptake, the MOF may be MIL-142A and/or PCN-250.

The range, nature and efficiency of gas adsorption by porous solids is well known to the person skilled in the art, and the invention is not limited by the gas or gases able to be adsorbed. The person skilled in the art is aware of a range of gases absorbable by various known MOFs including but not limited to carbon dioxide.

Optionally, the dispersions of the invention comprise porous solid particles dispersed in a liquid selected from a deep eutectic solvent, a liquid oligomer, a bulky liquid, a liquid polymer, a silicone oil, a halogenated oil, a paraffin oil or a triglyceride oil. More particularly, the dispersions of the invention comprise porous solid particles dispersed in a liquid selected from a silicone oil, a halogenated oil, a paraffin oil or a triglyceride oil.

A deep eutectic solvent is a type of ionic solvent. They are generally formed from a eutectic mixture of Lewis or Brønsted acids and bases which can contain a variety of anionic and/or cationic species. More particularly, the deep eutectic solvent may be a mixture of choline chloride and urea.

In particular, the liquid oligomer may be derived from an alkene monomer or mixture of alkene monomers, more particularly a conjugated diene, even more particularly butadiene.

A bulky liquid may be defined in the context of the invention as a solvent having a molecular size which is too large to enter the pores of the porous solid. More particularly, the bulky liquid may be bis(2-ethylhexyl) adipate, tributyl phosphate, dioctyl terephthalate, dioctyl phthalate, tributyl phosphate or 15-crown-5 ether.

In particular, the liquid polymer may be a polyether, more particularly polyethylene glycol or dimethyl-polyethylene glycol.

Advantageously, the oils utilised as the liquid component of the invention are widely available and typically low-cost, making them ideal components for industrial or large-scale applications.

According to an embodiment of the invention, the liquid phase is a silicone oil. Suitable silicone oils include, for example, pure silicone oil (eg silicone oil 20 cst, silicone oil 50 cst, silicone oil 350 cst or silicone oil 1000 cst), silicone oil AP 100 and silicone oil AR 20. Silicone oils are cheap, readily available and biocompatible making them advantageous for use in the dispersions of the present invention. In addition, silicone oil has high thermal stability which facilitates material regeneration.

According to an embodiment of the invention, the liquid is a triglyceride oil. Suitable triglyceride oils include, for example olive oil, castor oil, sesame oil, sunflower oil, safflower oil, rapeseed oil, walnut oil, peanut oil, almond oil, clove oil, soybean oil, corn oil, cottonseed oil, anise oil and linseed oil.

According to an embodiment of the invention, the liquid can be a halogenated oil, which may be a chlorinated, brominated or fluorinated oil. Suitable halogenated oils include, for example a perfluoropolyether oil such as Fomblin Y oil, a fluorinated silicone such as Fluorosil J15, a fluorinated polydimethylsiloxane such as Fluorosil D2, a fluorinated alkyl polydimethylsiloxane copolymer such as Fluorosil H418, a fluorocarbon ether such as Krytox oil, chlorinated silicone oil and halocarbon oil 27.

According to an embodiment of the invention, the liquid phase is paraffin oil.

In some embodiments, the dispersion comprises a zeolite dispersed in a silicone oil. In particular, the zeolite may be zeolite 3A, zeolite 5A, zeolite 13X, zeolite Rho, zeolite AgX or zeolite AgA.

In some embodiments, the dispersion may comprise 1-50 wt % of the porous solid. More particularly, the dispersion may comprise 5-30 wt % of the porous solid, even more particularly 10-15 wt % of the porous solid. In particular, the dispersion may comprise 11-14 wt % of the porous solid, more particularly 12-13 wt %.

In the dispersion according to the present invention, the pores of the porous solid are accessible to a gas. Optionally, the gas is $CO_2$, $CH_4$, $N_2$, $C_2H_4$ or $C_2He$.

According to another aspect of the present invention there is provided a method for preparing a dispersion comprising at least the step of: mixing a porous solid, in particularly a MOF, and a liquid selected from the group consisting of a deep eutectic solvent, a liquid oligomer, a bulky liquid, a liquid polymer, silicone oils, halogenated oils, paraffin oils and triglyceride oils and combinations thereof. The porous solid may be as defined above.

Optionally, the mixing includes agitating, stirring, sonication or grinding or a combination thereof.

In an embodiment, the method comprises stirring the mixture.

In an embodiment, the mixture is stirred at between 100 to 2,000 rpm. The duration or intensity of the stirring will depend on the nature of the porous solid and the liquid phase and is not particularly limited once a dispersion is formed. For instance, the mixture may be stirred for between 10 minutes to 3 hours, or between 30 minutes to 2 hours.

In an embodiment, the method comprises mixing up to 50 wt % of the porous solid, for example the MOF, with the liquid component of the dispersion. In other embodiments, the method comprises mixing from approximately 5 to approximately 30 wt %, or from approximately 10 to approximately 15 wt % of the porous solid, for example the MOF, with the liquid component of the dispersion.

MOFs can be activated using conventional methods in an oven and/or under vacuum. In an embodiment of the invention, a MOF is provided as a powder, and the powder is activated prior to being mixed with the liquid component of the dispersion.

In an alternative embodiment, a MOF is activated after the dispersion has been formed, i.e. the MOF, in powder form, is mixed with the liquid component of the dispersion and stirred or ground to prepare a dispersion, before the dispersion is activated. The dispersion can be activated in an oven and/or under vacuum.

The present invention also relates to a method of adsorbing a gas into a liquid, comprising at least the step of bringing the gas into contact with a dispersion comprising a porous material dispersed in a liquid phase, wherein the porous material is selected from a zeolite, a covalent organic framework (COF), a porous inorganic material, a Mobil Composition of Matter (MCM), a porous carbon and a MOF, and the liquid phase is selected from the group consisting of a deep eutectic solvent, a liquid oligomer, a bulky liquid, a liquid polymer, silicone oils, halogenated oils, paraffin oils, triglyceride oils and combinations thereof. More particular, the porous material and the liquid phase may be as defined above.

Optionally, the dispersion comprises a MOF in a liquid phase selected from silicone oils, halogenated oils, paraffin oils, triglyceride oils and combinations thereof as described above.

In an embodiment, the gas is in a gas mixture and the gas is selectively adsorbed by the dispersion.

Optionally, the gas is $CO_2$, $CH_4$, $N_2$, $C_2H4$ or $C_2He$. In particular, the gas may be $CO_2$.

The present invention also relates to the use of a porous solid as defined above, such as a MOF, to form a dispersion in a liquid phase or medium selected from deep eutectic solvents, liquid oligomers, bulky liquids, liquid polymers, silicone oils, halogenated oils, paraffin oils and triglyceride oils or a combination thereof.

The present invention also relates to a system comprising a porous solid as defined above, such as a MOF, and a liquid phase or medium capable of forming a dispersion, wherein the liquid medium is selected from deep eutectic solvents, liquid oligomers, bulky liquids, liquid polymers, silicone oils, halogenated oils, paraffin oils and triglyceride oils, or a combination thereof. The liquid medium (or liquid phase) may be as defined above.

The present invention also relates to a porous solid as defined above, such as a MOF, capable of forming a dispersion in a liquid phase, wherein the liquid phase is selected from the group consisting of deep eutectic solvents, liquid oligomers, bulky liquids, liquid polymers, silicone oils, halogenated oils, paraffin oils, triglyceride oils and combinations thereof. The liquid medium (or liquid phase) may be as defined above.

The present invention also relates to an assemblage of a porous solid dispersed in a liquid phase, and a gas contained within the pores of the porous material, wherein the liquid phase is selected from the group consisting of deep eutectic solvents, liquid oligomers, bulky liquids, liquid polymers, silicone oils, halogenated oils, paraffin oils, triglyceride oils and combinations thereof. The porous material may be selected from the group consisting of a zeolite, a covalent organic framework (COF), a porous inorganic material, a Mobil Composition of Matter (MCM), a porous carbon and a MOF. The porous material and liquid phase may be as defined above. Optionally, the porous material is a MOF.

Optionally, the assemblage further comprises at least one of the porous material being a MOF selected from HKUST-1, ZIF-7, ZIF-8, Al(fumarate)(OH), SIFSIX-3-Zn, SIFSIX-3-Cu, UiO-66-$NH_2$, UiO-66, Zr(fumarate), ZIF-90, and ZIF-67;

the liquid phase being as defined herein; and the gas being $CO_2$.

FIGURES

Figure 5:
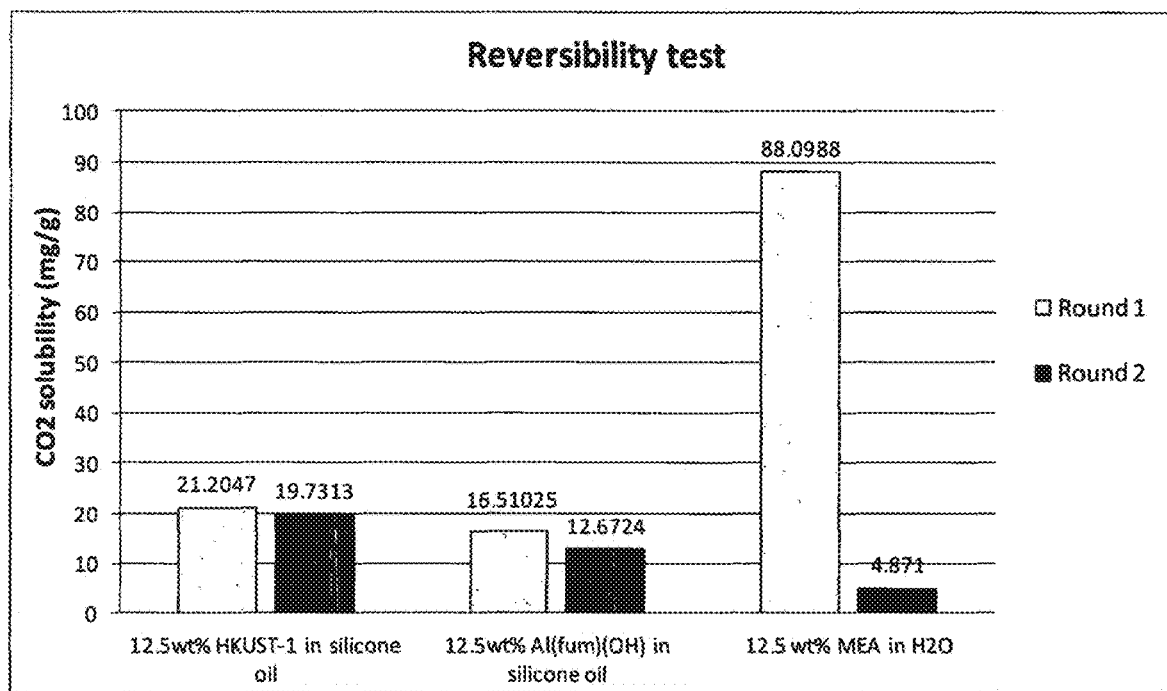
Figure 6:
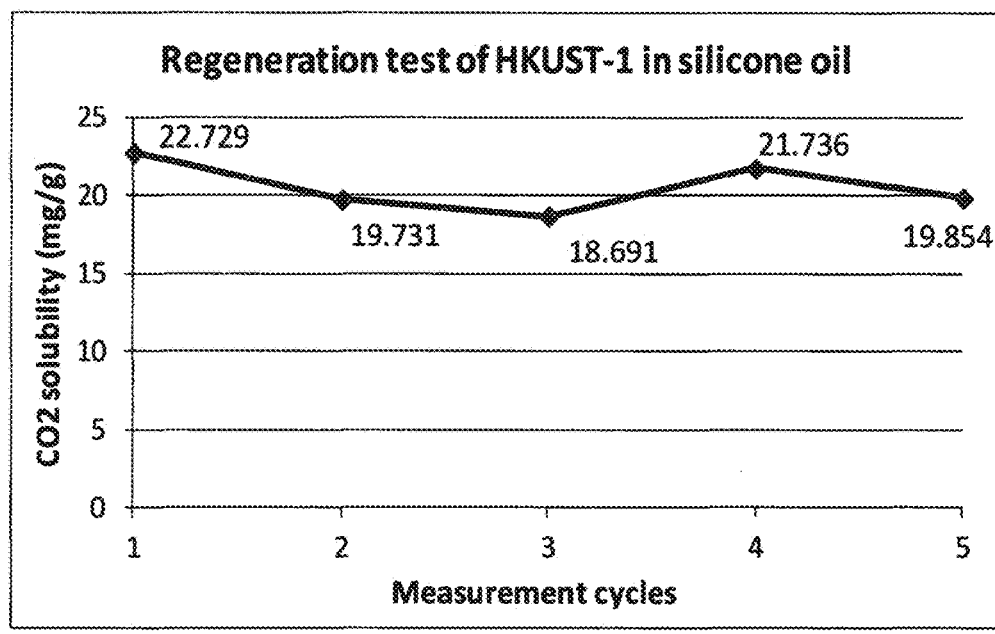
Figure 7:
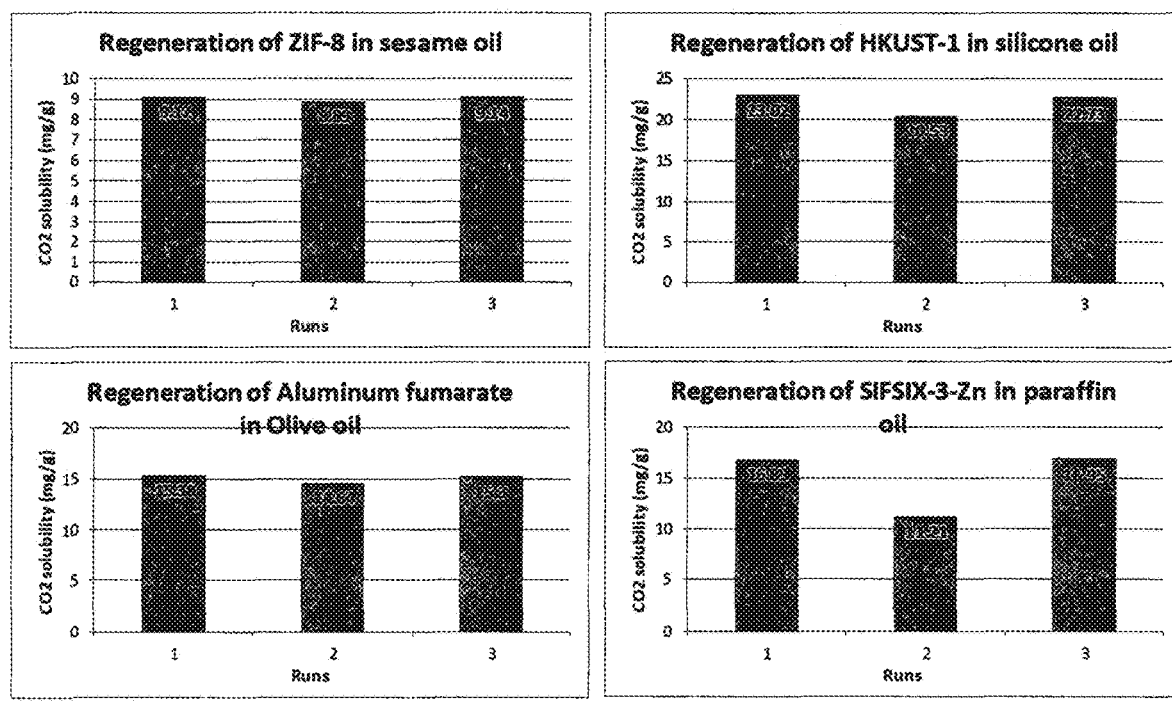
Figure 8:
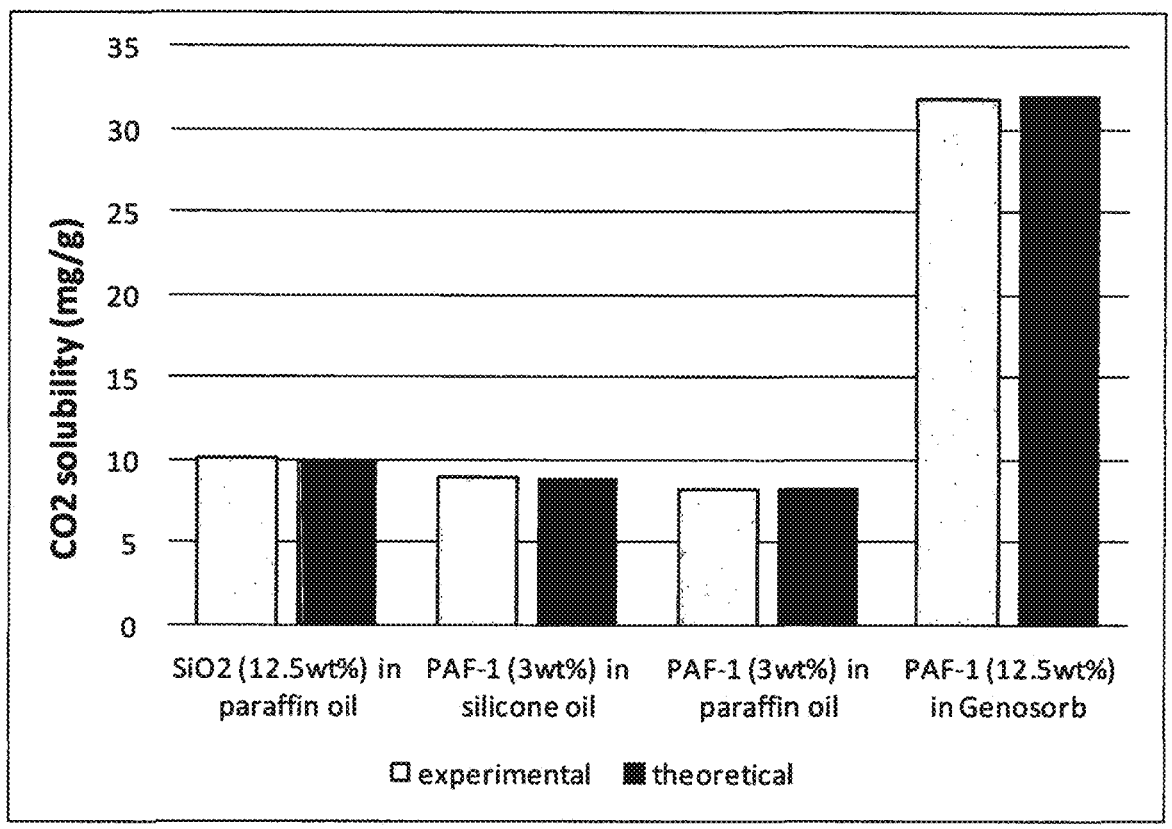

FIG. 3 shows PXRD traces of the dispersions of Examples 5 to 8; wherein FIG. 3(*a*) shows (i) ZIF-8 in silicone oil, (ii) ZIF-8, and (iii) silicone oil; FIG. 3(*b*) shows (i) HKUST-1 in silicone oil, (ii) HKUST-1 and (iii) silicone oil; FIG. 3(*c*) shows (i) Al(fumarate)(OH) in silicone oil, (ii) Al(fumarate)(OH) and (iii) silicone oil; and FIG. 3(*d*) shows (i) SIFSIX-3-Zn in silicone oil, (ii) SIFSIX-3-Zn and (iii) silicone oil;

FIG. 4 shows IR spectra for the dispersions of Examples 5 to 8; namely FIG. 4(*a*) shows (i) ZIF-8 in 50 cst silicone oil, (ii) 50 cst silicone oil and (iii) ZIF-8; FIG. 4(*b*) shows (i) HKUST-1 in 50 cst silicone oil, (ii) 50 cst silicone oil and (iii) HKUST-1;

FIG. 4(*c*) shows (i) Al(fumarate)(OH) in 50 cst silicone oil, (ii) 50 cst silicone oil and (iii) A(fumarate)(OH): and FIG. 4(*d*) shows (i) SIFSIX-3-Zn in 50 cst silicone oil, (ii) 50 cst silicone oil and (iii) SIFSIX-3-Zn;

FIG. 5 is a reversibility test and shows $CO_2$ uptake for dispersions of Examples 6 and 7 following regeneration;

FIG. 6 is a regeneration study of HKUST-1 in silicone oil and shows $CO_2$ uptake for dispersions of Examples 6 following multiple regeneration cycles;

FIG. 7 shows further regeneration studies, depicting $CO_2$ update for various dispersions after one, two and three cycles; and FIG. 8 shows experimental and theoretical_$CO_2$ uptake for dispersions of Examples 37-40.

Figure 9:
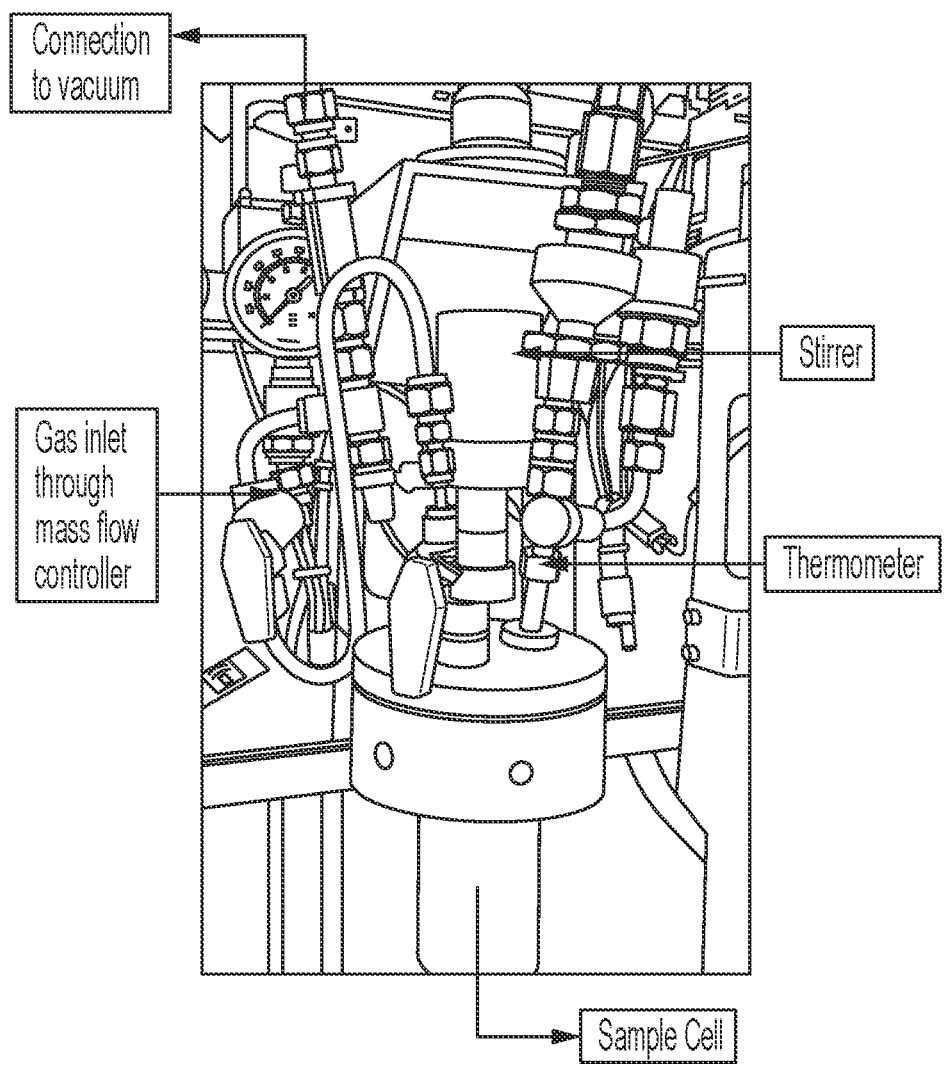

FIG. 9 shows a Parr reactor used in the high pressure gas update studies.

EXAMPLES

The following examples are intended to be illustrative only.

Experimental Methodology

Materials

All materials were obtained from Sigma Aldrich UK in >98% purity or Molekula in >96% purity and were used as obtained without further purification. PXRD measurements were carried out on a PAN analytical X'Pert Pro X-ray diffractometer. Copper was used as the X-ray source with a wavelength of 1.5405 Å. Diffractograms were typically obtained from 550° with a step size of 0.0167°. $CO_2$ uptake test was carried out on BINDER oven with EDWARDS pressure monitor. Gas uptake measurement was carried out at 25° C. and c.a. 0.8 bar.

Equipment

Figure 1:
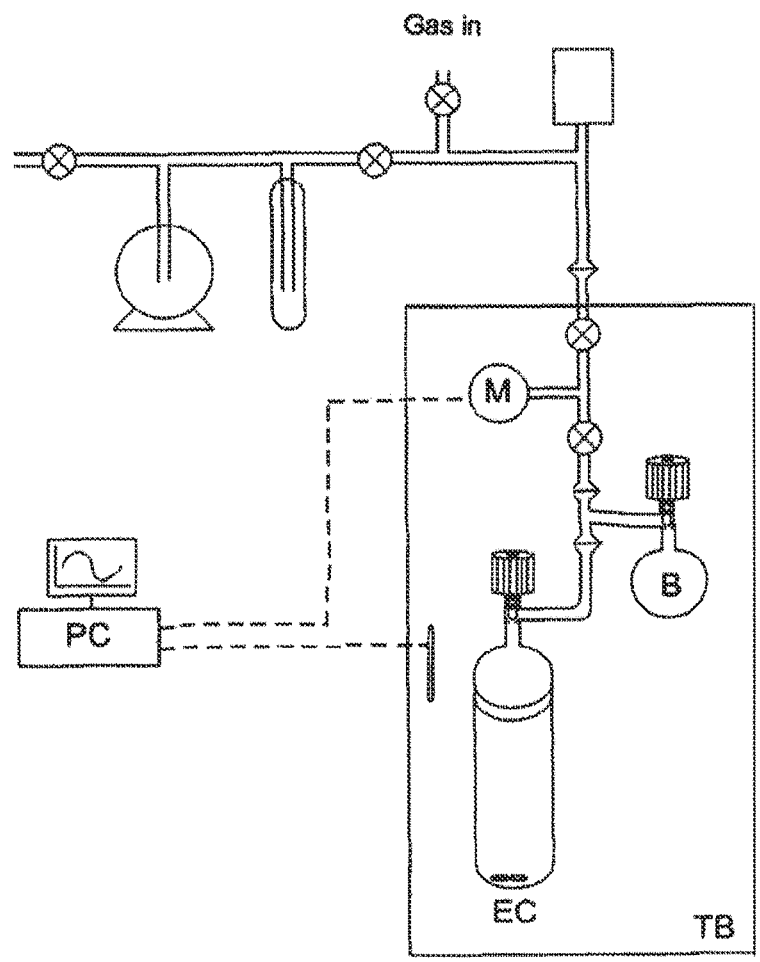
FIG. 1 is a schematic diagram showing apparatus for gas uptake measurement.
Figure 2A:
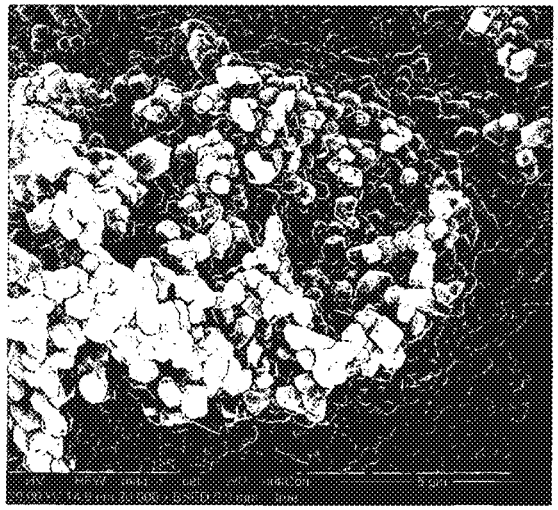
FIG. 2 shows SEM images of the synthesized MOFs; namely FIG. 2(*a*) ZIF-8, FIG. 2(*b*) HKUST-1, FIG. 2(*c*) Al(fumarate)(OH), FIG. 2(*d*) SIFSIX-3-Zn.
Figure 2B:
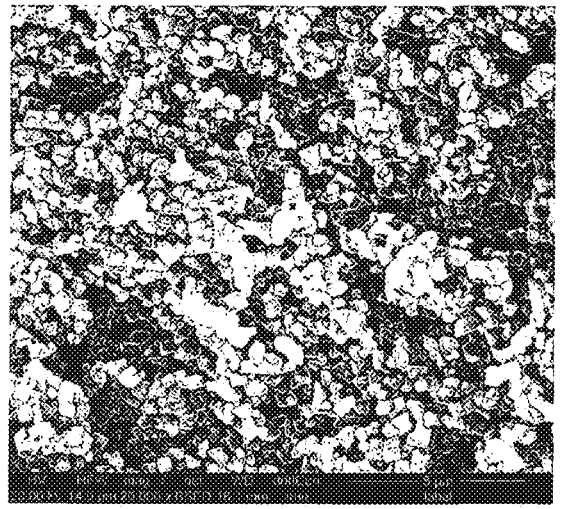
Figure 2C:
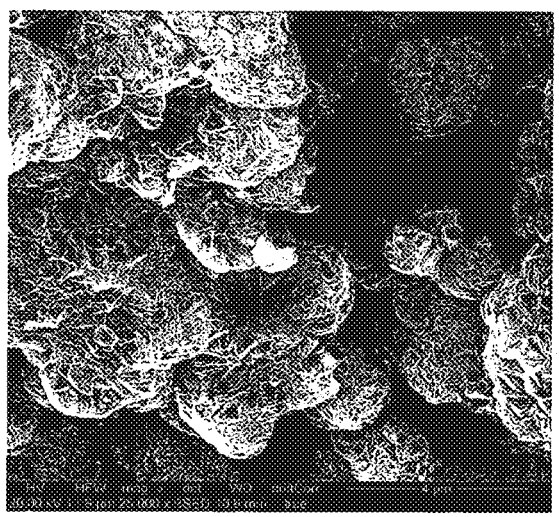
Figure 2D:
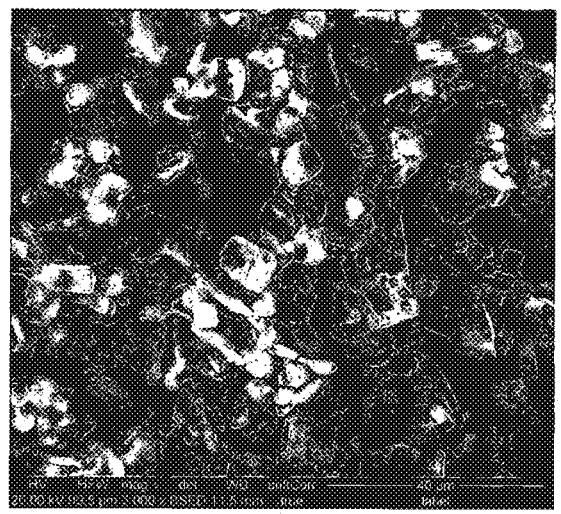

FIG. 1 is a schematic diagram showing apparatus for gas uptake measurements performed by a pressure drop method. The apparatus is held within a temperature controlled oven (TB) and the whole system is attached to a vacuum line. The liquid sample was held in the sample cell (EC) with a stirring bar and the gas reservoir (B) was filled with a known amount of $CO_2$ and remains closed before measurement. The system was then isolated from vacuum and the $CO_2$ was released from the gas reservoir. The pressure in the system was monitored by a manometer (M) attached to a PC (PC).

Preparation of MOFs

All MOFs were synthesized as described in the literature and known in the art. Generally, the starting metal salt and corresponding ligand are mixed in methanol and stirred overnight. The resulting precipitate is washed with methanol three times and collected by centrifugation. The resultant MOF is dried under air. Specific syntheses are described below:

Example 1: Synthesis of ZIF-8

Solution synthesis: $Zn(NO_3)_2.6H_2O$ (1.00 g, 3.36 mmol) was dissolved in 20 mL methanol (MeOH) in a conical flask. 2-methylimidazole (1.10 g, 13.44 mmol) was dissolved in a separated 20 mL methanol and mixed with former solution. The mixture is then stirring overnight at room temperature under air. The obtained solid was washed with 20 mL MeOH 3 times. Activation conditions: 200° C. for 3 hours in the oven. Ball mill synthesis: $Zn_5(CO_3)_2(OH)_6$ (0.175 g, 0.32 mmol) and 2-methylimidazole (0.393 g, 4.79 mmol) were added to a 25 mL ball mill jar with 13.6 ball bearing, followed by addition of 50 uL MeOH. The mixture was then milled for 30 min at 20 Hz. The obtained solid was washed with 10 mL EtOH 3 times. Activation conditions: 150° C. for 3 hours in the oven.

Example 2: Synthesis of HKUST-1

Solution synthesis: $Cu(NOs)_2.2.5H_2O$ (0.5 g, 2.15 mmol) was dissolved in 10 mL methanol in a conical flask. Benzene-1,3,5-tricarboxylic acid (0.91 g, 4.30 mmol) was dissolved in a separated 10 mL methanol and mixed with former solution. The mixture was then stirring overnight at room temperature under air. The obtained solid was washed with 10 mL MeOH 3 times. Activation conditions: 200° C. for 5 hours in the oven. Ball mill synthesis: $Cu(OH)_2$ (0.21 g, 2.15 mmol) and benzene-1,3,5-tricarboxylic acid (0.29 g, 1.37 mmol) were added to a 25 mL ball mill jar with 13.6 ball bearing, followed by addition of 0.5 mL MeOH. The mixture was then milled for 15 min at 25 Hz. The obtained solid was washed with 20 mL EtOH 3 times. Activation conditions: 200° C. for 3 hours in the oven.

Example 3: Synthesis of Al(fumarate)(OH)

$A_2(SO_4)_3.18H_2O$ (1.225 g, 3.58 mmol) was dissolved in 15 mL deionised water in a conical flask. Fumaric acid (415 mg, 3.57 mmol) and NaOH (286.4 mg, 7.16 mmol) were dissolved in a separate 15 mL quantity of deionised water and mixed with the former solution. The mixture was then heated at 60° C. for 3 hours and cooled to room temperature. The off-white precipitate was collected by centrifugation and washed with 15 mL deionised water twice, followed by 15 mL MeOH twice, the obtained solid was dried under air. Activation conditions: 200° C. for 3 hours in the oven.

Example 4: Synthesis of SIFSIX-3-Zn $ZnSiF_6$ (100 mg, 0.48 mmol) was dissolved in 3 mL methanol in a vial. Pyrazine (77.2 mg. 0.96 mmol) was dissolved in a separate 2 mL quantity of methanol and mixed with the former solution. The mixture was stirred overnight at room temperature under air. A pale yellow precipitate was collected by centrifugation, washed with 5 mL MeOH twice, dried under vacuum and stored under $N_2$. Activation conditions: 55° C. for 3 hours under vacuum.

Example 4a: Synthesis of SIFSIX-3-Cu $CuSiF_6$ (98.7 mg, 0.48 mmol) was dissolved in 3 mL methanol in a vial. Pyrazine (77.2 mg, 0.96 mmol) was dissolved in a separate 2 mL quantity of methanol and mixed with the former solution. The mixture was stirred overnight at room temperature under air. A pale yellow precipitate was collected by centrifugation, washed with 5 mL MeOH twice, dried under vacuum and stored under $N_2$. Activation conditions: 55° C. for 3 hours under vacuum.

Example 4b: Synthesis of UiO-66

$ZrCl_4$ (1.29 g, 5.54 mmol) was dissolved in 30 mL DMF in a conical flask. Terephthalic acid (0.9 g, 7.76 mmol) was dissolved in a separate 30 mL quantity of DMF and mixed with the former solution. The mixture was transferred to an autoclave and heated at 120° C. overnight before being allowed to cool to room temperature. The off-white precipitate was collected by centrifugation, washed with 20 mL DMF twice, followed by 20 mL MeOH, and the obtained solid was dried overnight in air. Activation condition: 200° C. for 2 hours under vacuum.

Example 4c: Synthesis of UiO-66-$NH_2$ $ZrCl_4$ (200 mg, 0.86 mmol) was dissolved in a mixture of 5 mL DMF and 0.1 mL $H_2O$ in a conical flask. 2-aminoterephthalic acid (155.5 mg. 0.86 mmol) was dissolved in a separate 5 mL quantity of DMF and mixed with the former solution. The mixture was transferred to an autoclave and heated at 120° C. overnight before being allowed to cool to room temperature. The pale yellow precipitate was collected by centrifugation, washed with 10 mL DMF twice, followed by 10 mL MeOH, and the obtained solid was dried overnight in air. Activation condition: 200° C. for 2 hours under vacuum.

Example 4d: Synthesis of ZIF-67

$CO(NO_3)_2.6H_2O$ (1.50 g, 5.15 mmol) was dissolved in 50 mL deionised water in a conical flask. 2-methylimidazole (1.69 g, 20.58 mmol) and triethylamine (2 mL) were dissolved in a separate 50 mL quantity of deionised water and mixed with the former solution. The mixture was stirred overnight at room temperature under air. The obtained solid was washed with 20 mL deionised water 3 times. Activation condition: 150° C. for 3 hours in the oven.

Example 4e: Synthesis of ZIF-90

$Zn(NO_3)_2.6H_2O$ (0.51 g, 1.72 mmol) was dissolved in 10 mL DMF in a conical flask. 2-imidazolecarboxaldehyde (0.79 g, 8.27 mmol) and dihexylamine (1.2 mL) were dissolved in a separate 10 mL quantity of DMF and mixed with the former solution. The mixture was stirred overnight at room temperature under air. The obtained solid was washed with 20 mL DMF twice and methanol twice. Activation condition: 150° C. for 2 hours in the oven.

Example 4f: Synthesis of Zr(Fumarate)

$ZrCl_4$ (2.33 g, 9.99 mmol) was dissolved in 25 mL deionised water in a conical flask. Fumaric acid (1.16 g, 9.99 mmol) was dissolved in acetic acid (25 mL) and mixed with the former solution. The mixture was heated to 95° C. for 1 hour under air. The obtained solid was washed with 50 mL deionised water 3 times. Activation condition: 200° C. for 2 hours in the oven.

Example 4g: Synthesis of MIL-53(Al)

$A(NO_3).H_2O$ (1.00 g, 2.67 mmol) was dissolved in 10 mL deionised water in a conical flask. Terephthalic acid (0.996 g, 5.99 mmol) was dissolved in 25 mL DMF and mixed with the former solution. The mixture was transferred to autoclave and heated to 150° C. for 3 days. The obtained solid was washed with 10 mL DMF and 10 deionised water 3 times. Activation condition: 200° C. for 2 hours in the oven.

Example 4h: Synthesis of CAU-10-H

Aluminium sulfate hydrate (Al2(SO4)3.18H2O) (5.05 g, 7.5 mmol) was dissolved in 25 mL of H2O, and isophthalic acid (1.32 g, 7.9 mmol) dissolved in 7 mL of DMF. The two solutions were combined in a round bottom flask. The combined mixture was heated under reflux at 105° C. for 117 hrs. After cooling down the precipitate was filtered, redispersed for washing in 200 mL of $H_2O$ by stirring. The dispersion was filtered again and dried for 2 days at 100° C. Activation condition: 120° C. for 5 days under vacuum.

Example 4i: Synthesis of ZIF-7

A solid mixture of zinc nitrate hexahydrate (0.8 g, 2.69 mmol) and of benzimidazole (0.24 g, 2.03 mmol) was dissolved in 75 mL of dimethylformamide (DMF). The solution was poured into a Teflon autoclave and put into oven at 130° C. for 48 hours. The product was then filtered. To remove the DMF from the pores of ZIF-7, the product underwent a solvent exchange with methanol for 48 hours at room temperature. The solid was then washed with methanol and dried at room temperature. Activation conditions: 150° C. for 2 hours in the oven.

Example 4j: Synthesis of Silver Zeolite AgX or AgA silver nitrate (8.49 g, 50 mmol) was dissolved in 100 mL distilled water to make a 0.5 M solution. Then 1 g of zeolite 5A/zeolite 13X was added into the silver nitrate solution and allowed to stir for 5 hours at 353K. Afterwards, the solid was washed thoroughly with distilled water (3×30 mL) and dried at room temperature. Activation conditions: 200° C. for 2 hours in the oven.

Example 4k: Synthesis of PAF-1

Tetrakis(4-bromophenyl)methane synthesis

To a three-necked round-bottom flask containing bromine (6.4 mL, 19.9 g), tetraphenylmethane (2.0 g, 6.24 mmol) was added stepwise in small portions under vigorous stirring at room temperature (25° C.). After the addition was completed, the resulting solution was stirred for 60 min and then cooled to 0° C. At 0° C., ethanol (25 mL) was added slowly, and the reaction mixture was allowed to warm to room temperature overnight. Then, the precipitate was filtered and subsequently washed with saturated aqueous sodium hydrogensulfite solution (25 mL) and water (100 mL). After drying at 80° C. for 24 h under vacuum, tetrakis(4-bromophenyl) methane was recrystallized in $EtOH/CH_2Cl_2$ to afford a yellow solid.

PAF-1 Synthesis

Tetrakis(4-bromophenyl)methane (509 mg, 0.8 mmol) was added to a solution of 2,2-bipyridyl (565 mg, 3.65 mmol), bis(1,5cyclooctadiene)nickel(0) (1.0 g, 3.65 mmol), and 1,5-cyclooctadiene (0.45 mL, 3.65 mmol) in anhydrous DMF/THF (60 mL/90 mL), and the mixture was stirred overnight at room temperature under nitrogen atmosphere. After the reaction, 6 M HCl (60 mL) was added slowly, and the resulting mixture was stirred for 12 h. The precipitate was collected by filtration, then washed with methanol and water, and dried at 150° C. for 24 h under vacuum (80 mbar) to produce PAF-1 as a white powder.

Activation conditions: 200° C. for 3 hours.

Characterisation of MOFs

The physical characteristics of the selected MOFs of Examples 1 to 4 are shown in Table 3 below.

TABLE 3

| | Physical characteristics of synthesized MOFs | | | | |
|---|---|---|---|---|---|
| | Morphology | Average particle Size | Density | Aperture | Colour |
| HKUST-1 | Irregular | 500 nm | 0.88 g/cm³ | 6.9 Å, 4.1 Å | Light blue |

TABLE 3-continued

Physical characteristics of synthesized MOFs

| | Morphology | Average particle Size | Density | Aperture | Colour |
|---|---|---|---|---|---|
| ZIF-8 | Hexagonal | 400 nm | 0.95 g/cm$^3$ | 3.4 Å | Off white |
| Al(fumarate)(OH) | Flake | N/A | N/A | N/A | Off white |
| SIFSIX-3-Zn | Rectangular | 20 um | 1.4 g/cm$^3$ | 3.8 Å | Pale yellow |

The MOFs were also imaged using Scanning Electron Microscopy (SEM) and SEM images of the MOFs of Examples 1 to 4 are shown in FIG. 2.

Synthesis of Dispersions

Example 5: ZIF-8 in Silicone Oil (50 Cst)

Figure 3A:
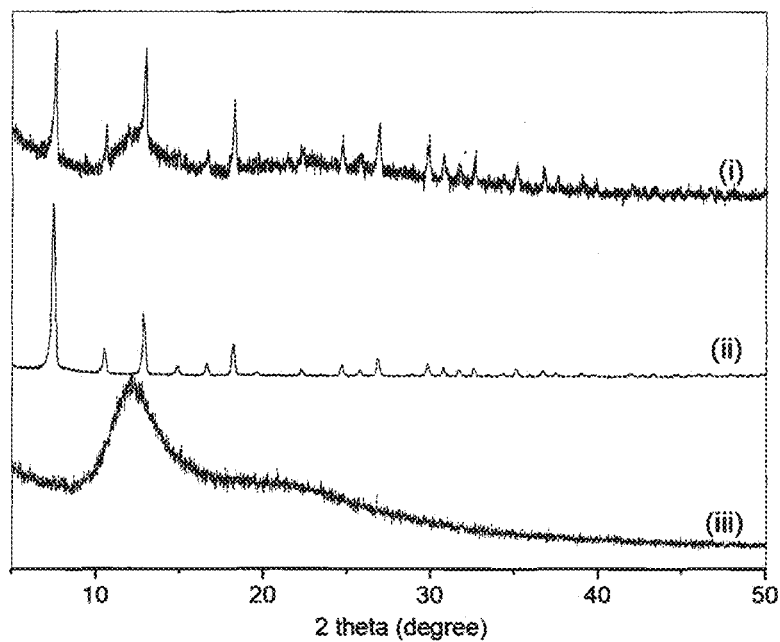
Figure 4A:
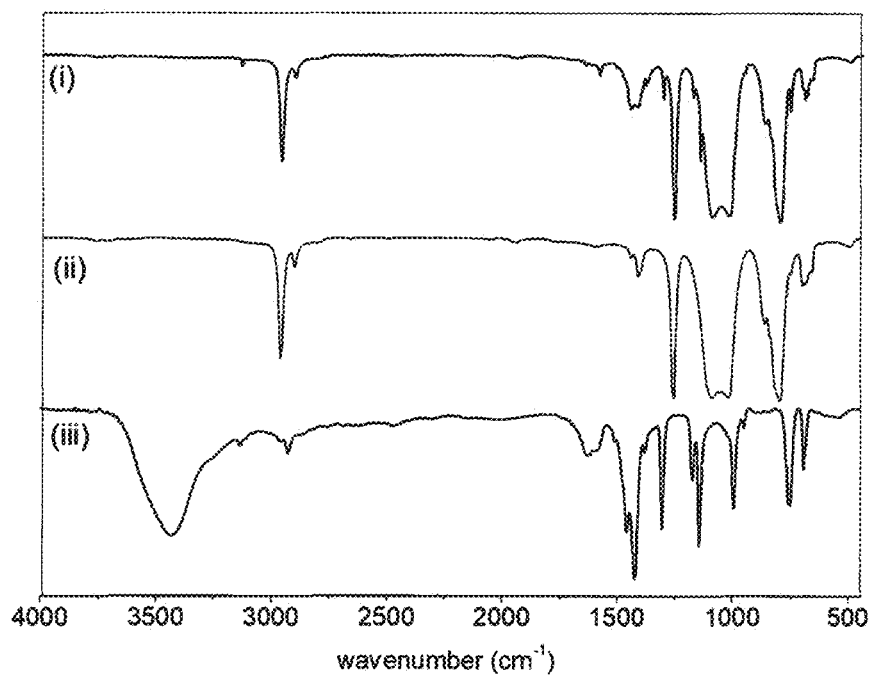

ZIF-8 MOF was prepared as described in Example 1, and activated by heating at 200° C. for 2 hours. 200 mg of the activated ZIF-8 powder was added to 1.3 mL silicone oil (density: 0.98 gmL$^{-1}$) with stirring at 600 rpm with a magnetic stirrer in a 10 mL glass vial. The dispersion was characterized by powder X-Ray Diffraction (PXRD) and Infrared Spectroscopy (IR) and the data are shown in FIGS. 3(a) and 4(a).

Example 6: HKUST-1 in Silicone Oil (50Cst)

Figure 3B:
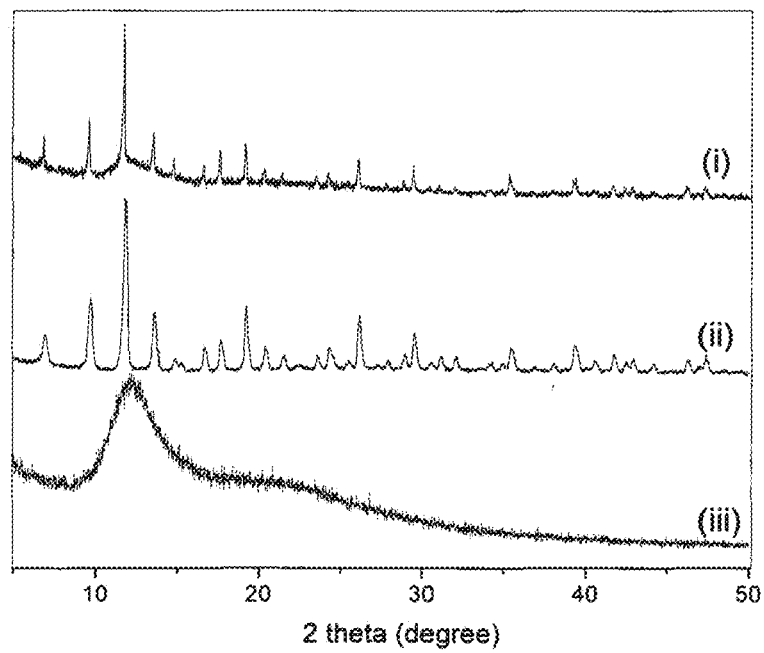
Figure 4B:
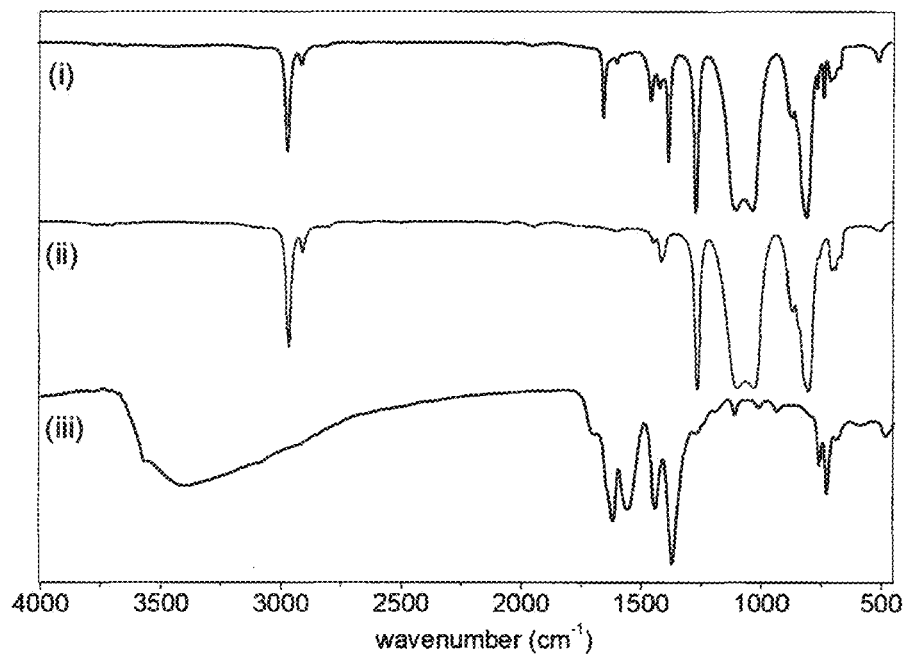

HKUST-1 MOF was prepared as described in Example 2, and activated by heating at 200° C. for 3 hours. 180 mg of the activated HKUST-1 powder was added to 1.3 mL silicone oil (density: 0.98 gmL$^{-1}$) under stirring at 600 rpm with a magnetic stirrer in a 10 mL glass vial. The dispersion was characterized by powder X-Ray Diffraction (PXRD) and Infrared Spectroscopy (IR) and the data are shown in FIGS. 3(b) and 4(b).

Example 7: Al(Fumarate)OH in Silicone Oil (50Cst)

Figure 3C:
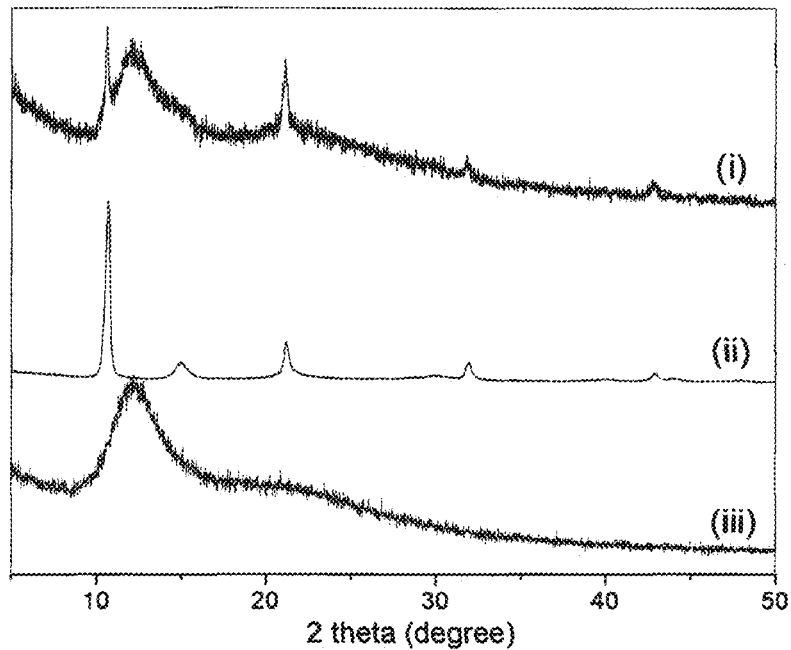
Figure 4C:
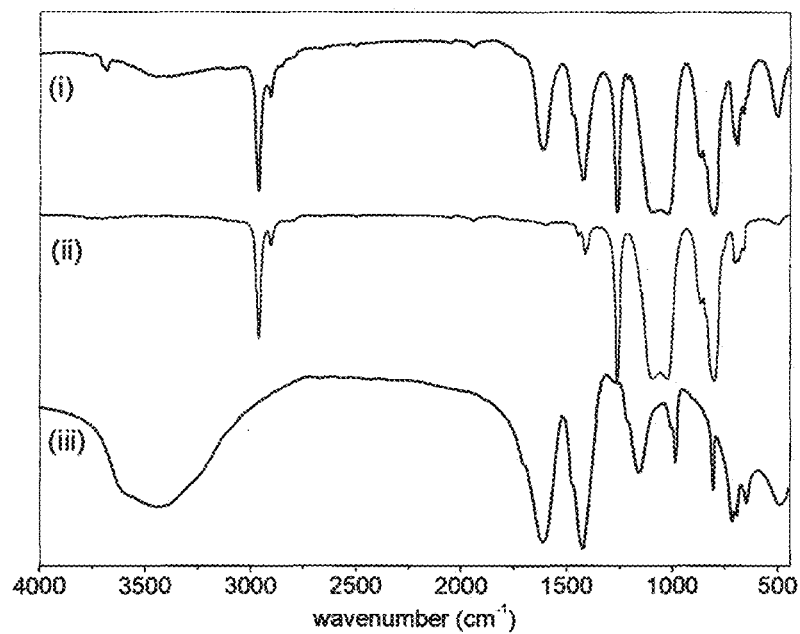

A(fumarate)(OH) MOF was prepared as described in Example 3 and activated by heating at 200° C. for 2 hours. 180 mg of the activated A(fumarate)(OH) powder was added to 1.3 mL silicone oil (density: 0.98 gmL$^{-1}$) under stirring at 600 rpm with a magnetic stirrer in a 10 mL glass vial. The dispersion was characterized by powder X-Ray Diffraction (PXRD) and Infrared Spectroscopy (IR) and the spectra are shown in FIGS. 3(c) and 4(c).

Example 8: SIFSIX-3-Zn in Silicone Oil (50Cst)

Figure 3D:
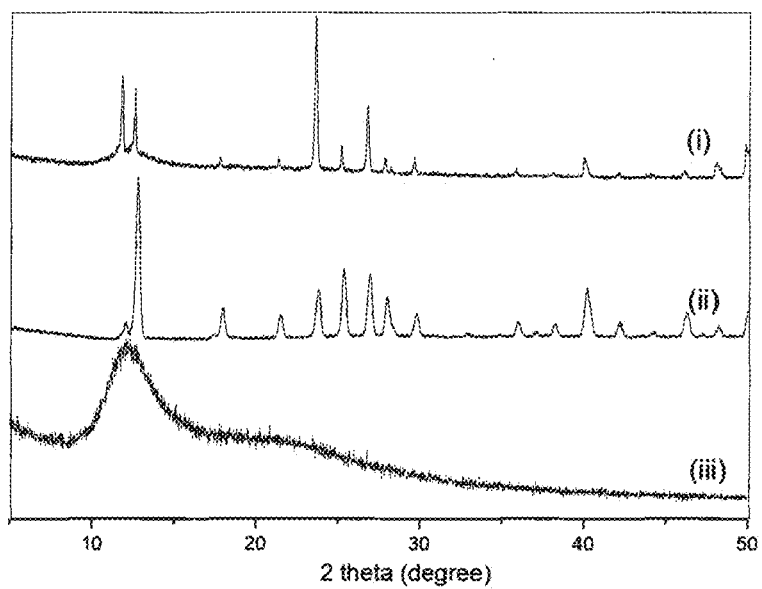
Figure 4D:
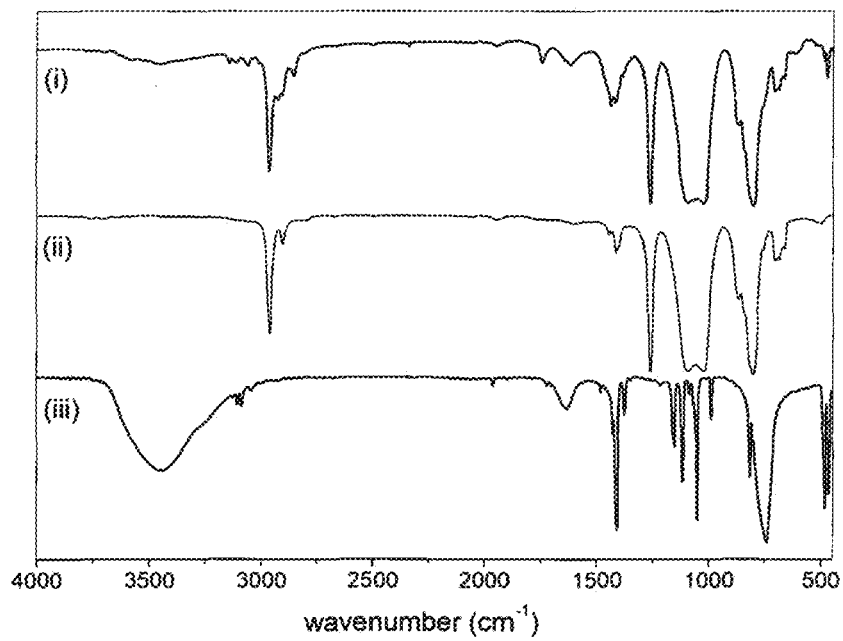

SIFSIX-3-Zn MOF was prepared as described in Example 4 and activated by vacuum at 55° C. for 3 hours. 180 mg of the activated SIFSIX-3-Zn powder was added to 1.3 mL silicone oil (density: 0.98 gmL$^1$) under stirring at 600 rpm with a magnetic stirrer in a 10 mL glass vial. The dispersion was characterized by powder X-Ray Diffraction (PXRD) and Infrared Spectroscopy (IR) and the data are shown in FIGS. 3(d) and 4(d).

Example 9: ZIF-8 in Silicone Oil (350Cst)

ZIF-8 MOF was prepared as described in Example 1, and activated by heating at 200° C. for 2 hours. 200 mg of the activated ZIF-8 powder was added to 1.3 mL silicone oil (density: 0.98 gmL$^{-1}$) under stirring at 600 rpm with a magnetic stirrer in a 10 mL glass vial.

Example 10: HKUST-1 in Silicone Oil (350Cst)

HKUST-1 MOF was prepared as described in Example 2, and activated by heating at 200° C. for 3 hours. 180 mg of the activated HKUST-1 powder was added to 1.3 mL silicone oil (density: 0.98 gmL$^{-1}$) under stirring at 600 rpm with a magnetic stirrer in a 10 mL glass vial.

Example 11: Al(Fumarate)OH in Silicone Oil (350Cst)

A(fumarate)(OH) MOF was prepared as described in Example 3 and activated by heating at 200° C. for 2 hours. 180 mg of the activated Al(fumarate)(OH) powder was added to 1.3 mL silicone oil (density: 0.98 gmL$^{-1}$) under stirring at 600 rpm with a magnetic stirrer in a 10 mL glass vial.

Example 12: SIFSIX-3-Zn in Silicone Oil (350Cst)

SIFSIX-3-Zn MOF was prepared as described in Example 4 and activated by vacuum at 55° C. for 3 hours. 180 mg of the activated SIFSIX-3-Zn powder was added to 1.3 mL silicone oil (density: 0.98 gmL$^{-1}$) under stirring at 600 rpm with a magnetic stirrer in a 10 mL glass vial.

Example 13: ZIF-8 in Silicone Oil (1000Cst)

ZIF-8 MOF was prepared as described in Example 1, and activated by heating at 200° C. for 2 hours. 200 mg of the activated ZIF-8 powder was added to 1.3 mL silicone oil (density: 0.98 gmL$^{-1}$) under stirring at 600 rpm with a magnetic stirrer in a 10 mL glass vial.

Example 14: HKUST-1 in Silicone Oil (1000Cst)

HKUST-1 MOF was prepared as described in Example 2, and activated by heating at 200° C. for 3 hours. 180 mg of the activated HKUST-1 powder was added to 1.3 mL silicone oil (density: 0.98 gmL$^{-1}$) under stirring at 600 rpm with a magnetic stirrer in a 10 mL glass vial.

Example 15: Al(Fumarate)(OH) in Silicone Oil (1000Cst)

A(fumarate)(OH) MOF was prepared as described in Example 3 and activated by heating at 200° C. for 2 hours. 180 mg of the activated Al(fumarate)(OH) powder was added to 1.3 mL silicone oil (density: 0.98 gmL$^{-1}$) under stirring at 600 rpm with a magnetic stirrer in a 10 mL glass vial.

Example 16: SIFSIX-3-Zn in Silicone Oil (1000Cst)

SIFSIX-3-Zn MOF was prepared as described in Example 4 and activated by vacuum at 55° C. for 3 hours. 180 mg of the activated SIFSIX-3-Zn powder was added to 1.3 mL silicone oil (density: 0.98 gmL$^{-1}$) under stirring at 600 rpm with a magnetic stirrer in a 10 mL glass vial.

Example 17: ZIF-8 in Fomblin Y Oil (60Cst)

ZIF-8 MOF was prepared as described in Example 1, and activated by heating at 200° C. for 2 hours. 200 mg of the activated ZIF-8 powder was added to 1.3 mL Fomblin Y oil (density: 1.88 gmL$^{-1}$) under stirring at 600 rpm with a magnetic stirrer in a 10 mL glass vial.

Example 18: HKUST-1 in Fomblin Y Oil (60Cst)

HKUST-1 MOF was prepared as described in Example 2, and activated by heating at 200° C. for 3 hours. 180 mg of the activated HKUST-1 powder was added to 1.3 mL Fomblin Y oil (density: 1.88 gmL$^{-1}$) under stirring at 600 rpm with a magnetic stirrer in a 10 mL glass vial.

Example 19: Al(Fumarate)OH) in Fomblin Y Oil (60Cst)

A(fumarate)(OH) MOF was prepared as described in Example 3 and activated by heating at 200° C. for 2 hours. 180 mg of the activated A(fumarate)(OH) powder was added to 1.3 mL Fomblin Y oil (density: 1.88 gmL$^{-1}$) under stirring at 600 rpm with a magnetic stirrer in a 10 mL glass vial.

Example 20: SIFSIX-3-Zn in Fomblin Y Oil (60Cst)

SIFSIX-3-Zn MOF was prepared as described in Example 4 and activated by vacuum at 55° C. for 3 hours. 180 mg of the activated SIFSIX-3-Zn powder was added to 1.3 mL Fomblin Y oil (density: 1.88 gmL$^{-1}$) under stirring at 600 rpm with a magnetic stirrer in a 10 mL glass vial.

Example 21: ZIF-8 in Olive Oil (84 Cst)

ZIF-8 MOF was prepared as described in Example 1, and activated by heating at 200° C. for 2 hours. 200 mg of the activated ZIF-8 powder was added to 1.3 mL olive oil (density: 0.91 gmL$^{-1}$) under stirring at 600 rpm with a magnetic stirrer in a 10 mL glass vial.

Example 22: HKUST-1 in Olive Oil (84 Cst)

HKUST-1 MOF was prepared as described in Example 2, and activated by heating at 200° C. for 3 hours. 180 mg of the activated HKUST-1 powder was added to 1.3 mL olive oil (density: 0.91 gmL$^{1}$) under stirring at 600 rpm with a magnetic stirrer in a 10 mL glass vial.

Example 23: Al(Fumarate)(OH) in Olive Oil (84 Cst)

A(fumarate)(OH) MOF was prepared as described in Example 3 and activated by heating at 200° C. for 2 hours. 180 mg of the activated A(fumarate)(OH) powder was added to 1.3 mL olive oil (density: 0.91 gmL$^{-1}$) under stirring at 600 rpm with a magnetic stirrer in a 10 mL glass vial.

Example 24: SIFSIX-3-Zn in Olive Oil (84 Cst)

SIFSIX-3-Zn MOF was prepared as described in Example 4 and activated by vacuum at 55° C. for 3 hours. 180 mg of the activated SIFSIX-3-Zn powder was added to 1.3 mL olive oil (density: 0.91 gmL$^{-1}$) under stirring at 600 rpm with a magnetic stirrer in a 10 mL glass vial.

Example 25: ZIF-8 in Sesame Oil (65 Cst)

ZIF-8 MOF was prepared as described in Example 1, and activated by heating at 200° C. for 2 hours. 200 mg of the activated ZIF-8 powder was added to 1.3 mL sesame oil (density: 0.92 gmL$^{-1}$) under stirring at 600 rpm with a magnetic stirrer in a 10 mL glass vial.

Example 26: HKUST-1 in Sesame Oil (65 Cst)

HKUST-1 MOF was prepared as described in Example 2, and activated by heating at 200° C. for 3 hours. 180 mg of the activated HKUST-1 powder was added to 1.3 mL sesame oil (density: 0.92 gmL$^{-1}$) under stirring at 600 rpm with a magnetic stirrer in a 10 mL glass vial.

Example 27: Al(Fumarate)OH) in Sesame Oil (65 Cst)

A(fumarate)(OH) MOF was prepared as described in Example 3 and activated by heating at 200° C. for 2 hours. 180 mg of the activated Al(fumarate)(OH) powder was added to 1.3 mL sesame oil (density: 0.92 gmL$^{-1}$) under stirring at 600 rpm with a magnetic stirrer in a 10 mL glass vial.

Example 28: SIFSIX-3-Zn in Sesame Oil (65 Cst)

SIFSIX-3-Zn MOF was prepared as described in Example 4 and activated by vacuum at 55° C. for 3 hours. 180 mg of the activated SIFSIX-3-Zn powder was added to 1.3 mL sesame oil (density: 0.92 gmL$^{-1}$) under stirring at 600 rpm with a magnetic stirrer in a 10 mL glass vial.

Example 29: ZIF-8 in Paraffin Oil (110-230 Cst)

ZIF-8 MOF was prepared as described in Example 1, and activated by heating at 200° C. for 2 hours. 200 mg of the activated ZIF-8 powder was added to 1.3 mL paraffin oil (density: 0.827-0.890 gmL$^{-1}$) under stirring at 600 rpm with a magnetic stirrer in a 10 mL glass vial.

Example 30: HKUST-1 in Paraffin Oil (110-230 Cst)

HKUST-1 MOF was prepared as described in Example 2, and activated by heating at 200° C. for 3 hours. 180 mg of the activated HKUST-1 powder was added to 1.3 mL paraffin oil (density: 0.827-0.890gmL$^{-1}$) under stirring at 600 rpm with a magnetic stirrer in a 10 mL glass vial.

Example 31: Al(Fumarate)(OH) in Paraffin Oil (110-230 Cst)

A(fumarate)(OH) MOF was prepared as described in Example 3 and activated by heating at 200° C. for 2 hours.

180 mg of the activated A(fumarate)(OH) powder was added to 1.3 mL paraffin oil (density: 0.827-0.890 gmL$^{-1}$) under stirring at 600 rpm with a magnetic stirrer in a 10 mL glass vial.

Example 32: SIFSIX-3-Zn in Paraffin Oil (110-230 Cst)

SIFSIX-3-Zn MOF was prepared as described in Example 4 and activated by vacuum at 55° C. for 3 hours. 180 mg of the activated SIFSIX-3-Zn powder was added to 1.3 mL paraffin oil (density: 0.827-0.890 gmL$^{-1}$) under stirring at 600 rpm with a magnetic stirrer in a 10 mL glass vial.

Example 33: ZIF-8 in Castor Oil (964 Cst)

ZIF-8 MOF was prepared as described in Example 1, and activated by heating at 200° C. for 2 hours. 200 mg of the activated ZIF-8 powder was added to 1.3 mL castor oil (density: 0.92 gmL$^{-1}$) under stirring at 600 rpm with a magnetic stirrer in a 10 mL glass vial.

Example 34: HKUST-1 in Castor Oil (964 Cst)

HKUST-1 MOF was prepared as described in Example 2, and activated by heating at 200° C. for 3 hours. 180 mg of the activated HKUST-1 powder was added to 1.3 mL castor oil (density: 0.92 gmL$^{-1}$) under stirring at 600 rpm with a magnetic stirrer in a 10 mL glass vial.

Example 35: A(Fumarate)OH in Castor Oil (964 Cst)

Al(fumarate)(OH) MOF was prepared as described in Example 3 and activated by heating at 200° C. for 2 hours. 180 mg of the activated A(fumarate)(OH) powder was added to 1.3 mL castor oil (density: 0.92 gmL$^{-1}$) under stirring at 600 rpm with a magnetic stirrer in a 10 mL glass vial.

Example 36: SIFSIX-3-Zn in Castor Oil (964 Cst)

SIFSIX-3-Zn MOF was prepared as described in Example 4 and activated by vacuum at 55° C. for 3 hours. 180 mg of the activated SIFSIX-3-Zn powder was added to 1.3 mL castor oil (density: 0.92 gmL$^{-1}$) under stirring at 600 rpm with a magnetic stirrer in a 10 mL glass vial.

Example 37: Porous SiO$_2$ in Paraffin Oil 180 mg of the porous SiO$_2$ was added to 1.3 mL paraffin oil (density: 0.827-0.890 gmL$^{-1}$) under stirring at 600 rpm with a magnetic stirrer in a 10 mL glass vial.

Example 38: PAF-1 in Silicone Oil (50 Cst)

62 mg of PAF-1 was added to 2.2 mL silicone oil (density: 0.98 gmL$^{-1}$) under stirring at 600 rpm with a magnetic stirrer in a 10 mL glass vial.

Example 38: PAF-1 in Paraffin Oil 62 mg of PAF-1 was added to 2.2 mL paraffin oil (density: 0.827-0.890 gmL$^{-1}$) under stirring at 600 rpm with a magnetic stirrer in a 10 mL glass vial.

Example 38: PAF-1 In Polyethylene glycol (Genosorb)

180 mg of PAF-1 was added to 1.3 mL polyethylene glycol (density: 0.93 gmL$^{-1}$) under stirring at 600 rpm with a magnetic stirrer in a 10 mL glass vial.

Comparative Example 1: HKUST-1 in PEG-200

Comparative Example 2: ZIF-8 in PEG-200

Comparative Example 3: ZIF-8 in 15-Crown-5

Comparative Example 4: HKUST-1 in Oleic Acid

Comparative Example 5: ZIF-8 in Oleic Acid

Characterisation of Dispersions

Following synthesis, all dispersions were characterized by Powder X-Ray Diffraction (PXRD) and Infrared Spectroscopy (IR). Each of the PXRD spectra showed MOF patterns which were identical to those of the original MOF, confirming that the structure of the MOF component of the dispersion remained intact after mixing in the dispersion. The PXRD patterns and IR spectra of the dispersions of examples 5 to 8 are shown in FIGS. 3 (PXRD) and 4 (IR).

Stability Studies

The stability of the dispersions of the invention is important for their industrial applicability. The stability of the dispersions can be optimised by, for instance, reducing the size of the porous particles, increasing the viscosity of the liquid component, matching the densities of the porous solid particles and the liquid component, as well as by enhancing interaction between the solid particles and the liquid medium. The stability of MOFs in various liquid phases was determined and the results are shown in Tables 4a and 4b.

TABLE 4a

Summary of dispersion stability

| Liquid medium | MOF | | | | |
|---|---|---|---|---|---|
| | HKUST-1 | ZIF-8 | Al(fum)(OH) | SIFSIX-3-Zn | SIFSIX-3-Cu |
| Silicone oil (20 cst) | X | √ | √ | X | X |
| Silicone oil (50 cst) | X | √ | √ | X | X |
| Silicone oil (350 cst) | √ | √ | √ | √ | √ |
| Silicone oil (1000 cst) | √ | √ | √ | √ | √ |

TABLE 4a-continued

Summary of dispersion stability

| Liquid medium | MOF | | | | |
|---|---|---|---|---|---|
| | HKUST-1 | ZIF-8 | Al(fum)(OH) | SIFSIX-3-Zn | SIFSIX-3-Cu |
| Silicone based oil AR 20 | √ | √ | √ | X | √ |
| Fomblin Y oil 60 cst | X | X | X | √ | X |
| Krytox Y oil 60 cst | √ | √ | √ | √ | √ |
| Paraffin oil | √ | √ | √ | X | √ |
| Olive Oil | √ | √ | √ | √ | √ |
| Castor Oil | √ | √ | √ | √ | √ |
| Sesame Oil | √ | √ | √ | √ | √ |
| Corn oil | √ | √ | √ | √ | √ |
| Soy bean oil | √ | √ | √ | √ | √ |
| Sunflower oil | √ | √ | √ | √ | √ |
| Safflower oil | √ | √ | √ | √ | √ |

X: requires stirring to maintain homogeneous dispersion.
√: without stirring, dispersion remains stable for at least one day.

TABLE 4b

Summary of dispersion stability

| | Liquid medium | | |
|---|---|---|---|
| | Silicone oil (50 cst) | Olive oil | Krytox oil 177 cst |
| MOFs | | | |
| UiO-66 | X | √ | — |
| UiO-66-NH2 | X | √ | — |
| ZIF-67 | √ | √ | — |
| Zr-fumarate | X | √ | — |
| ZIF-90 | √ | √ | — |
| Zeolites | | √ | — |
| Zeolite 3A | X | √ | — |
| Zeolite 5A | X | √ | — |
| Zeolite 13X | X | √ | — |
| Activated carbon | X | √ | √ |

X: requires stirring to maintain homogeneous dispersion.
√: without stirring, dispersion remains stable for at least one day.

From the above tables it can be seen that some of the dispersions are stable for at least one day. Other dispersions require stirring in order to maintain a homogeneous dispersion.

As listed, some porous liquid mixtures can form stable dispersion for at least 1 day, but few of them require stirring in order to maintain the homogeneous dispersion.

Gas Uptake Studies

Gas uptake studies were carried out using a volumetric technique based on an isochoric method. The measurements were carried out at around 0.8 bar and 298 k.

All pure porous solids have been measured to compare with known literature values (Table 5a). Also, pure liquid media have been measured for calculation of prediction gas uptake. All porous liquids were measured with 12.5 wt % porous solid content, unless specified.

TABLE 5a $CO_2$ uptake of pure porous solids

| | Experimental (mg/g (mmol/g)) | Literature (mg/g (mmol/g)) |
|---|---|---|
| MOFs | | |
| HKUST-1 | 170.76 (3.88) | 197.61 (4.49) |
| ZIF-8 | 36.97 (0.84) | 43.13 (0.98) |

TABLE 5a-continued $CO_2$ uptake of pure porous solids

| | Experimental (mg/g (mmol/g)) | Literature (mg/g (mmol/g)) |
|---|---|---|
| Al(fum)(OH) | 95.59 (2.17) | 91.98 (2.09) |
| SIFSIX-3-Zn | 118.83 (2.70) | 112.23 (2.55) |
| SIFSIX-3-Cu | 109.14 (2.48) | — |
| UiO-66 | 79.22 (1.80) | 55.89 (1.27) |
| UiO-66-NH2 | 90.66 (2.06) | 102.10 (2.32) |
| ZIF-67 | 42.25 (0.96) | 41.37 (0.94) |
| Zr-fumarate | 79.22 (1.80) | 80.10 (1.82) |
| ZIF-90 | 104.30 (2.37) | — |
| MIL-53(Al) | 98.6 (2.24) | 110.03 (2.50) |
| CAU-10-H | 98.60 (2.24) | 110.20 (2.30) |
| Zeolites | | |
| Zeolite 3A | 134.23 (3.05)* | — |
| Zeolite 5A | 47.97 (1.09)* | — |
| Zeolite 13X | 69.54 (1.58)* | — |
| Zeolite RhO | 115.7 (2.63) | 154.04 (3.50) |
| Activated carbon | | |
| G-60 | 126.31 (2.87) | — |

*No activation treatment.

$CO_2$ Uptake $CO_2$ uptake was measured for each of the dispersions of Examples 5 to 36 above, and for the dispersions prepared in accordance with comparative examples 1 to 3. Theoretical uptake, based on known uptake for the MOF and liquid phase components were calculated, and the measured and theoretical values are shown in Table 5b below. All solid content in porous liquids are measured at 12.5 wt % loading, unless specified.

TABLE 5b $CO_2$ uptake of elected compositions of porous liquids (mg/g (mmol/g))

| | Silicone oil (50 cst) 5.04 (0.12) | | Silicone oil (350 cst) 3.87 (0.09) | | Silicone oil (1000 cst) 3.27 (0.07) | | Fluorinated oil (60 cst)** 3.16 (0.07) | |
|---|---|---|---|---|---|---|---|---|
| | Exp. | Cal. | Exp. | Cal. | Exp. | Cal. | Exp. | Cal. |
| HKUST-1 | 23.76 (0.54) | 25.96 (0.59) | 24.77 (0.56) | 24.89 (0.57) | 21.28 (0.48) | 24.36 (0.55) | 6.21 (0.14) | 14.72 (0.33) |
| ZIF-8 | 9.68 (0.22) | 9.24 (0.21) | 8.61 (0.20) | 8.41 (0.19) | 7.76 (0.18) | 7.89 (0.18) | 6.40 (0.15) | 5.48 (0.12) |
| Al(fum)(OH) | 15.84 (0.36) | 16.28 (0.37) | 16.86 (0.38) | 15.43 (0.35) | 16.87 (0.38) | 14.91 (0.39) | 11.57 (0.26) | 9.63 (0.22) |

TABLE 5b-continued

CO$_2$ uptake of elected compositions of porous liquids (mg/g (mmol/g))

| SIFSIX-3-Zn | 19.81 (0.45) | 21.12 (0.48) | 18.17 (0.41) | 18.35 (0.42) | 16.51 (0.38) | 17.83 (0.41) | 8.58 (0.19) | 11.25 (0.26) |
|---|---|---|---|---|---|---|---|---|

| | Paraffin oil 3.67 (0.08) | | Olive oil 3.86 (0.09) | | Castor oil 3.64 (0.08) | | Sesame oil 3.80 (0.09) | |
|---|---|---|---|---|---|---|---|---|
| | Exp. | Cal. | Exp. | Cal. | Exp. | Cal. | Exp. | Cal. |
| HKUST-1 | 3.05 (0.07) | 24.87 (0.57) | 21.13 (0.48) | 24.65 (0.56) | 21.28 (0.48) | 25.34 (0.58) | 20.04 (0.46) | 25.25 (0.57) |
| ZIF-8 | 8.23 (0.19) | 7.88 (0.18) | 9.24 (0.21) | 7.48 (0.17) | 9.55 (0.22) | 7.96 (0.18) | 8.84 (0.20) | 7.87 (0.18) |
| Al(fum)(OH) | 13.73 (0.32) | 15.26 (0.35) | 15.40 (0.35) | 15.40 (0.35) | 14.21 (0.33) | 15.34 (0.35) | 15.81 (0.36) | 15.25 (0.35) |
| SIFSIX-3-Zn | 14.89 (0.34) | 18.32 (0.42) | 15.84 (0.36) | 18.48 (0.42) | 15.53 (0.35) | 18.40 (0.42) | 15.12 (0.34) | 18.31 (0.42) |

**6.5 wt % loading

Additionally, 2 wt % of porous solid loading have been tested and also show good agreement of experimental values and theoretical values (Table 5c)

TABLE 5c

CO$_2$ uptake of 25 wt % porous solid loading

| | Experimental | Theoretical |
|---|---|---|
| ZIF-8 in sesame oil | 10.98 | 11.71 |
| HKUST-1 in silicone oil | 42.50 | 44.12 |
| Zn-SIFSIX-3 in paraffin oil | 27.12 | 26.62 |
| Al (fum) (OH) in olive oil | 28.33 | 26.19 |

TABLE 5d

CO$_2$ uptake table for a broader range of example compositions (mg/g (mmol/g)).

| | silicone oil 50 cst 4.84 (0.11) | | Olive oil 3.08 (0.07) | |
|---|---|---|---|---|
| | Exp. | Theo. | Exp. | Theo. |
| MOFs | | | | |
| SIFSIX-3-Cu | 14.96 (0.34) | 18.04 (0.41) | 17.60 (0.40) | 16.28 (0.37) |
| UiO-66 | 11.44 (0.26) | 14.52 (0.33) | 11.44 (0.26) | 13.20 (0.30) |
| UiO-66-NH2 | 15.40 (0.35) | 15.84 (0.36) | 15.40 (0.35) | 14.52 (0.33) |
| ZIF-67 | 10.56 (0.24) | 9.68 (0.22) | 8.36 (0.19) | 7.92 (0.18) |
| Zr-fumarate | 16.72 (0.38) | 14.52 (0.33) | 10.56 (0.24) | 12.63 (0.29) |
| ZIF-90 | 15.84 (0.36) | 17.60 (0.40) | 14.52 (0.33) | 15.84 (0.36) |
| MIL-53(Al) | 31.24 (0.71) | 28.16 (0.64) | — | — |
| CAU-10-H | 16.96 (0.39) | 16.74 (0.38) | 13.96 (0.32) | 14.99 (0.34) |
| Zeolites | | | | |
| Zeolite 3A | 20.25 (0.46) | 20.68 (0.47) | 20.68 (0.47) | 21.12 (0.48) |
| Zeolite 5A | 9.68 (0.22) | 9.68 (0.22) | 9.68 (0.22) | 9.24 (0.21) |
| Zeolite 13X | 13.64 (0.31) | 13.20 (0.30) | 13.64 (0.31) | 13.20 (0.30) |
| Zeolite Rho | 20.23 (0.46) | 18.92 (0.43) | 20.25 (0.46) | 17.16 (0.39) |
| Act. Carbon | | | | |
| Activated carbon G-60 | 15.40 (0.35) | 20.24 (0.46) | 15.84 (0.36) | 18.48 (0.42) |

TABLE 5d

CO$_2$ uptake summary table for a range of further example compositions (mg/g (mmol/g))

| | | | Silicone oil 20 cst 3.52 (0.08) | | Silicone oil 50 cst 4.84 (0.11) | | Silicone oil 350 cst 3.96 (0.09) | | Silicone oil 1000 cst 3.08 (0.07) | | Silicone based oil AR 20 3.08 (0.07) | | Fomblin Y oil 60** cst 3.08 (0.07) | | Krytox oil 177 cst** 3.96 (0.09) | |
|---|---|---|---|---|---|---|---|---|---|---|---|---|---|---|---|---|
| | Exp. | Lit. | Exp. | Theo. | Exp. | Theo. | Exp. | Theo. | Exp. | Theo. | Exp. | Theo. | Exp. | Theo. | Exp | The. |
| MOFs | | | | | | | | | | | | | | | | |
| ZIF-8 | 36.97 (0.84) | 43.12 (0.98) | 8.80 (0.20) | 7.92 (0.18) | 9.68 (0.22) | 9.24 (0.21) | 8.80 (0.20) | 7.92 (0.18) | 7.92 (0.18) | 7.92 (0.18) | 9.68 (0.22) | 7.92 (0.18) | 6.60 (0.15) | 5.28 (0.12) | 6.16 (0.14) | 6.16 (0.14) |
| Zeolites | | | | | | | | | | | | | | | | |
| Zeolite 3A | 134.23 (3.05) | — | 22.89 (0.52) | 19.80 (0.45) | 20.24 (0.46) | 20.68 (0.47) | 24.65 (0.56) | 20.25 (0.46) | 22.45 (0.51) | 19.80 (0.45) | 19.36 (0.44) | 19.81 (0.45) | 12.76 (0.29) | 12.32 (0.28) | 13.20 (0.30) | 12.32 (0.28) |

**6.5 wt % porous solid loading

TABLE 5d ctd

CO$_2$ uptake summary table for a range of further example compositions (mg/g (mmol/g))

| | | | Paraffin oil 3.52 (0.08) | | Olive oil 3.08 (0.07) | | Castor oil 3.52 (0.08) | | Sesame oil 3.52 (0.08) | | Sunflower oil 3.52 (0.08) | | Safflower oil 3.96 (0.09) | | Soy Bean oil 3.08 (0.07) | | Corn oil 3.52 (0.08) | |
|---|---|---|---|---|---|---|---|---|---|---|---|---|---|---|---|---|---|---|
| | Exp. | Lit. | Exp | Theo. | Exp. | Theo. | Exp. | Theo. | Exp. | Theo. | Exp. | Theo | Exp. | Theo. | Exp | Theo. | Exp. | Theo. |
| MOFs | | | | | | | | | | | | | | | | | | |
| ZIF-8 | 36.97 (0.84) | 43.12 (0.98) | 8.36 (0.19) | 7.92 (0.18) | 9.24 (0.21) | 7.48 (0.17) | 9.68 (0.22) | 7.92 (0.18) | 8.80 (0.20) | 7.92 (0.18) | 7.92 (0.18) | 7.48 (0.17) | 7.92 (0.18) | 7.48 (0.17) | 7.92 (0.18) | 7.92 (0.18) | 8.80 (0.20) | 7.92 (0.18) |
| Zeolites | | | | | | | | | | | | | | | | | | |
| Zeolite 3A | 134.23 (3.05) | | 20.24 (0.46) | 20.24 (0.46) | 20.68 (0.47) | 21.12 (0.48) | 20.68 (0.47) | 20.68 (0.47) | 20.25 (0.46) | 21.12 (0.48) | 20.25 (0.46) | 20.68 (0.47) | 20.25 (0.46) | 20.25 (0.46) | 20.25 (0.46) | 20.25 (0.46) | 20.25 (0.46) | 20.25 (0.46) |

TABLE 5e

CO$_2$ uptake for PAF-1 (mg/g (mmol/g))

| 3 wt % PAF-1 in silicone oil 50 cst | | 3 wt % PAF-1 in paraffin oil | | 3 wt % PAF-1 in Olive oil | | 3 wt % PAF-1 in Sesame oil | | 3 wt % PAF-1 in Castor oil | |
|---|---|---|---|---|---|---|---|---|---|
| Exp | Cal | Exp | Cal | Exp | Cal | Exp | Cal | Exp | Cal |
| 8.96 (0.20) | 8.82 (0.20) | 8.23 (0.19) | 8.29 (0.19) | 8.96 (0.20) | 8.58 (0.19) | 9.19 (0.21) | 8.53 (0.19) | 7.96 (0.18) | 8.25 (0.19) |

| 3 wt % PAF-1 in Safflower oil | | 3 wt % PAF-1 in Soybean oil | | 3 wt % PAF-1 in Sunflower oil | | 3 wt % PAF-1 in Corn oil | | 12.5 wt % PAF-1 in Genosorb | |
|---|---|---|---|---|---|---|---|---|---|
| Exp | Cal | Exp | Cal | Exp | Cal | Exp | Cal | Exp | Cal |
| 8.33 (0.19) | 8.36 (0.19) | 8.56 (0.19) | 8.39 (0.19) | 8.29 (0.19) | 8.36 (0.19) | 8.24 (0.19) | 8.19 (0.19) | 31.91 (0.73) | 32.34 (0.73) |

TABLE 5f

CO$_2$ uptake for other compositions (mg/g (mmol/g))

| 12.5 wt % ZIF-8 in Polyethylene glycol dibenzoate | | 12.5 wt % ZIF-8 in Polyethylene bis(2-ethyl-hexanoate) | | 12.5 wt % ZIF-8 in Polyethylene dimethyl ether acrylate | | 25 wt % ZIF-8 in Polyethylene bis(2-ethyl-hexanoate) | | 6.5 wt % activated carbon in Krytox oil | |
|---|---|---|---|---|---|---|---|---|---|
| Exp | Cal | Exp | Cal | Exp | Cal | Exp | Cal | Exp | Cal |
| 6.57 (0.15) | 7.05 (0.16) | 11.3 (0.26) | 11.52 (0.26) | 7.41 (0.16) | 8.98 (0.20) | 14.84 (0.34) | 16.49 (0.37) | 8.52 (0.19) | 10.23 (0.23) |

These results show that all of the dispersions show significantly higher levels of CO$_2$ uptake when compared with the uptake of the liquid phase alone, and in many cases up to 5 times higher than that of the pure oil. The measured values also show good correlation to the predicted, or calculated values, allowing for the precise design of the so-called porous liquids or dispersions. When the uptake of the comparative examples were measured, however, the uptake of the dispersions showed significant deviations from the predicted/calculated uptake values for the MOFs and the liquids, and in many cases lower uptake than the pure liquids alone.

CH$_4$ and N$_2$ Uptake

Gas selectivity is essential for industrial applications such as CO$_2$ capture from power plants or natural gas reserves. Accordingly, the CH$_4$ and N$_2$ uptake of the dispersions were also investigated, and the results are shown in Tables 6, 7, 7a, 7b, 7c and 7d.

TABLE 6

N$_2$ uptake

| Example | MOF | Liquid phase | Measured N$_2$ uptake (mg/g (mmol/g)) | Calculated N$_2$ uptake (mg/g (mmol/g)) | Uptake of N$_2$ in pure liquid (mg/g (mmol/g)) |
|---|---|---|---|---|---|
| Ex. 6 | HKUST-1 | Silicone oil (50 cst) | 2.10 (0.07) | 3.43 (0.12) | 0.81 (0.03) |
| Ex. 7 | Al(fum)(OH) | Silicone oil (50 cst) | 1.42 (0.05) | 1.63 (0.06) | 0.81 (0.03) |
| Ex. 22 | HKUST-1 | Olive oil | 3.68 (0.13) | 5.59 (0.18) | 2.65 (0.09) |
| Ex. 23 | Al(fum)(OH) | Olive oil | 2.82 (0.11) | 3.18 (0.11) | 2.65 (0.09) |

TABLE 7

CH$_4$ uptake

| Example | MOF | Liquid phase | Measured CH$_4$ uptake (mg/g (mmol/g)) | Calculated CH$_4$ uptake (mg/g (mmol/g)) | Uptake of CH$_4$ in pure liquid (mg/g (mmol/g)) |
|---|---|---|---|---|---|
| Ex. 6 | HKUST-1 | Silicone oil (50 cst) | 2.80 (0.17) | 3.08 (0.19) | 1.31 (0.07) |
| Ex. 7 | Al(fum)(OH) | Silicone oil (50 cst) | 3.43 (0.21) | 3.58 (0.22) | 1.31 (0.07) |
| Ex. 22 | HKUST-1 | Olive oil | 2.25 (0.14) | 3.1 (0.20) | 1.33 (0.08) |
| Ex. 23 | Al(fum)(OH) | Olive oil | 3.21 (0.20) | 3.72 (0.23) | 1.33 (0.08) |

TABLE 7a

CH$_4$ uptake ctd (units: mg/g (mmol/g))

| | | Silicone oil 50 cst 1.31 (0.07) | | Olive oil 1.33 (0.08) | |
|---|---|---|---|---|---|
| | Exp. | Exp. | Theo. | Exp. | Theo. |
| MOFs | | | | | |
| HKUST-1 | 15.40 (0.96) | 2.80 (0.17) | 3.08 (0.19) | 2.24 (0.14) | 3.19 (0.20) |
| ZIF-8 | 4.49 (0.28) | 1.44 (0.09) | 1.76 (0.11) | 1.28 (0.08) | 1.76 (0.11) |
| Al(fum)(OH) | 19.41 (1.21) | 3.43 (0.21) | 3.58 (0.22) | 3.21 (0.20) | 3.72 (0.23) |
| SIFSIX-3-Zn | 15.56 (0.97) | 2.72 (0.17) | 2.89 (0.18) | 2.89 (0.18) | 2.89 (0.18) |
| UiO-66 | 4.97 (0.31) | 1.60 (0.10) | 1.60 (0.10) | 1.28 (0.08) | 1.76 (0.11) |
| UiO-66-NH2 | 12.67 (0.79) | 2.08 (0.13) | 2.57 (0.16) | 2.73 (0.17) | 2.57 (0.16) |
| Zeolites | | | | | |
| Zeolite 13X | 5.13 (0.32) | 1.44 (0.09) | 1.60 (0.10) | 1.28 (0.08) | 1.76 (0.11) |

TABLE 7b

N$_2$ uptake (units: mg/g (mmol/g))

| | | Silicone oil 50 cst 0.81 (0.03) | | Olive oil 2.65 (0.09) | |
|---|---|---|---|---|---|
| | Exp. | Exp. | Theo. | Exp. | Theo. |
| MOFs | | | | | |
| HKUST-1 | 12.59 (0.45) | 2.10 (0.07) | 3.43 (0.12) | 3.68 (0.13) | 5.59 (0.18) |
| ZIF-8 | 5.84 (0.21) | 1.67 (0.06) | 1.70 (0.06) | 1.86 (0.07) | 1.96 (0.07) |
| Al(fum)(OH) | 6.64 (0.24) | 1.42 (0.05) | 1.63 (0.06) | 2.82 (0.11) | 3.18 (0.11) |
| SIFSIX-3-Zn | 8.68 (0.31) | 2.01 (0.07) | 2.15 (0.08) | 2.35 (0.08) | 3.39 (0.12) |
| SIFSIX-3-Cu | 10.31 (0.37) | 2.10 (0.07) | 2.13 (0.08) | 2.35 (0.08) | 2.38 (0.08) |
| UiO-66 | 4.20 (0.15) | 1.15 (0.04) | 2.26 (0.06) | 1.12 (0.04) | 1.12 (0.04) |

TABLE 7c

C$_2$H$_4$ uptake (units: mg/g (mmol/g))

| | | | Paraffin oil 1.60 (0.06) | | Silicone oil 2.81 (0.10) | | Sesame oil 1.96 (0.07) | |
|---|---|---|---|---|---|---|---|---|
| | Exp. | Lit. | Exp. | Theo. | Exp. | Theo. | Exp. | Theo. |
| HKUST-1 | 171.11 (6.10) | — | 8.98 (0.32) | 22.72 (0.81) | 20.76 (0.74) | 22.98 (0.85) | 23.84 (0.85) | 23.28 (0.83) |
| ZIF-8 | 57.22 (2.04) | 38.99 (1.39) | 8.78 (0.31) | 8.42 (0.30) | 9.26 (0.33) | 9.54 (0.34) | 7.85 (0.28) | 8.98 (0.32) |
| ZIF-7 | 50.49 (1.80) | 58.91 (2.10) | 4.77 (0.17) | 7.85 (0.28) | 9.82 (0.35) | 8.70 (0.31) | 7.57 (0.27) | 8.13 (0.29) |
| Zeolite 13X | 26.65 (0.95) | — | 5.05 (0.16) | 4.77 (0.17) | 4.49 (0.16) | 5.61 (0.20) | 4.49 (0.16) | 5.05 (0.18) |
| Zeolite 5A | 44.04 (1.57) | 68.16 (2.43) | 8.42 (0.30) | 7.01 (0.25) | 7.29 (0.25) | 7.85 (0.28) | 10.38 (0.37) | 7.29 (0.26) |
| Zeolite AgX | 83.59 (2.98) | 63.39 (2.26) | 7.85 (0.28) | 11.77 (0.42) | 9.26 (0.33) | 12.90 (0.46) | 8.13 (0.29) | 12.34 (0.44) |
| Zeolite AgA | 53.58 (1.91) | 58.91 (2.10) | 9.82 (0.35) | 8.13 (0.29) | 12.62 (0.45) | 9.26 (0.33) | 8.42 (0.30) | 8.42 (0.30) |

TABLE 7d

C$_2$H$_6$ uptake (units: mg/g (mmol/g))

| | | | Paraffin oil 3.91 (0.13) | | Silicone oil 6.01 (0.20) | | Sesame oil 4.51 (0.15) | |
|---|---|---|---|---|---|---|---|---|
| | Exp. | Lit. | Exp. | Theo. | Exp. | Theo. | Exp. | Theo. |
| HKUST-1 | 125.99 (4.19) | — | 6.01 (0.20) | 19.25 (0.64) | 16.84 (0.56) | 21.05 (0.67) | 20.45 (0.68) | 19.55 (0.65) |
| ZIF-8 | 65.55 (2.18) | 75.18 (2.50) | 12.33 (0.41) | 11.73 (0.39) | 12.93 (0.43) | 13.23 (0.44) | 8.12 (0.27) | 12.03 (0.40) |
| ZIF-7 | 69.46 (2.31) | 67.66 (2.25) | 13.54 (0.45) | 12.33 (0.41) | 9.05 (0.31) | 13.83 (0.46) | 13.53 (0.45) | 12.63 (0.42) |
| Zeolite 13X | 51.72 (1.72) | — | 10.53 (0.35) | 9.92 (0.33) | 9.02 (0.30) | 11.73 (0.39) | 11.73 (0.39) | 10.22 (0.34) |
| Zeolite 5A | 32.48 (1.08) | 51.72 (1.72) | 9.62 (0.32) | 7.52 (0.25) | 9.02 (0.3) | 9.32 (0.31) | 9.92 (0.33) | 7.82 (0.26) |
| Zeolite AgX | 9.53 (1.98) | 43.60 (1.45) | 7.82 (0.26) | 10.83 (0.36) | 12.03 (0.40) | 12.63 (0.42) | 11.12 (0.3) | 11.43 (0.38) |
| Zeolite AgA | 3.91 (0.13) | 2.71 (0.09) | 2.51 (0.08) | 3.91 (0.13) | 4.21 (0.14) | 5.71 (0.19) | 6.32 (0.21) | 4.21 (0.14) |

Selectivity (IAST)

As noted above, gas selectivity is extremely useful in industrial processes. Selectivity can be evaluated by the Ideal Absorbed Solution Theory (IAST) from pure gas adsorption as shown by Equation (1):

$$S = \frac{q_i / p_i}{q_j / p_j} \quad \text{Equation (1)}$$

In Equation 1, $q_i$ and $q_j$ represent the adsorption capacity of pure gas component; while $p_i$ and $p_j$ represent the partial pressure of the pure gas component.

This method is commonly used in porous solid materials (i.e. MOFs) to predict their gas selectivity behaviour. However, given that porous liquids are novel materials this method needs to be validated in relation to these new materials. Therefore, at this stage, a simpler and more straightforward method is applied for estimating gas selectivity. Selectivity is estimated by ratio ($A_{mmol/g}/B_{mmol/g}$) in order to compare it with the existing material (Genosorb 1753).

Values for $CO_2$ selectivity over $N_2$ ($CO_2/N_2$) and over $CH_4$ ($CO_2/CH_4$) were calculated for the dispersions of Examples 6, 7, 22 and 23, and the results are shown in Table 8 below:

TABLE 8

$CO_2$ selectivity over $N_2$ ($CO_2/N_2$) and over $CH_4$ ($CO_2/CH_4$)

| | $CO_2/N_2$ | | | | $CO_2/CH_4$ | | | |
|---|---|---|---|---|---|---|---|---|
| | Silicone oil 50 cst 3.67 | | Olive oil 0.77 | | Silicone oil 50 cst 1.57 | | Olive oil 0.88 | |
| | Exp. | Theo. | Exp. | Theo. | Exp. | Theo. | Exp. | Theo. |
| MOFs | | | | | | | | |
| HKUST-1 | 7.75 | 4.91 | 3.66 | 2.93 | 3.19 | 3.25 | 3.40 | 2.93 |
| ZIF-8 | 3.67 | 3.67 | 3.00 | 2/45 | 2.41 | 2.22 | 2.62 | 1.62 |
| Al(fum)(OH) | 7.12 | 6.43 | 3.46 | 3.07 | 1.69 | 1.69 | 1.74 | 1.50 |
| SIFSIX-3-Zn | 6.26 | 6.21 | 4.25 | 4.91 | 2.42 | 2.61 | 1.98 | 2.30 |
| SIFSIX-3-Cu | 4.86 | 5.13 | 5.00 | 5.12 | — | — | — | — |
| UiO-66 | 6.38 | 5.55 | 6.85 | 7.49 | 2.62 | 3.23 | 3.21 | 2.72 |
| UiO-66-NH2 | — | — | — | — | 2.73 | 2.25 | 2.09 | 2.09 |
| Zeolites | | | | | | | | |
| Zeolite 13X | — | — | — | — | 3.50 | 2.98 | 3.86 | 2.76 |

In addition, the separation of ethylene ($C_2H4$) and ethane ($C_2He$) is an important industrial process. As shown in Table 8a below, the porous liquids of the invention also have selectivity on ethylene over ethane.

TABLE 12

Selectivity of porous liquids by ratio: ($C_2H_4/C_2H_6$).

| | Paraffin oil 0.43 | | Silicone oil 0.50 | | Sesame oil 0.50 | |
|---|---|---|---|---|---|---|
| | Exp. | Theo. | Exp. | Theo. | Exp. | Theo. |
| MOFs | | | | | | |
| HKUST-1 | 1.45 | — | 1.63 | 1.27 | 1.32 | 1.22 | 1.25 | 1.27 |
| ZIF-8 | 0.94 | 0.56 | 0.77 | 0.78 | 0.77 | 0.77 | 1.03 | 0.80 |
| ZIF-7 | 0.78 | 0.93 | 0.37 | 0.68 | 1.15 | 0.68 | 0.58 | 0.69 |
| Zeolites | | | | | | | | |
| Zeolite 13X | 0.55 | — | 0.45 | 0.51 | 0.52 | 0.53 | 0.40 | 0.53 |
| Zeolite 5A | 1.46 | 1.41 | 0.94 | 0.98 | 0.84 | 0.92 | 1.12 | 0.99 |
| Zeolite AgX | 1.51 | 1.56 | 1.08 | 1.16 | 0.82 | 1.09 | 0.80 | 1.16 |
| Zeolite AgA | 15.33 | 23.17 | 4.49 | 2.19 | 3.27 | 1.74 | 1.44 | 2.11 |

High Pressure Measurement (1-5 Bar, 25° C.-75° C.)

High pressure gas uptake studies have been carried out using a Parr reactor (see FIG. 9) based on mass flow as developed at Queen's University, Belfast by Prof. David Rooney. All the measurements are carried out from 1 to 5 bar at 298K, 323K and 348K. Examples using Al(fum)(OH) are shown below (Table 13). Importantly, the measured $CO_2$ uptake of porous liquids under high pressure is comparable to the predicted values. This demonstrates the potential of the use of these materials in the gas separation industry (e.g. pressure swing adsorption (PSA) processes).

TABLE 13

High Pressure gas uptake measurement (1-5 bar; 298, 323, 348K)

| | Silicone oil (50 cst) | | | Al(fum)(OH) literature value | | |
|---|---|---|---|---|---|---|
| | 298K | 323K | 348K | 298K | 323K | 348K |
| 1 bar | 4.58 | 3.74 | 3.28 | 92.42 | 66.02 | 41.81 |
| 2 bar | 8.90 | 7.27 | 6.32 | 136.43 | 96.82 | 66.02 |
| 3 bar | 13.59 | 11.03 | 9.93 | 158.44 | 118.83 | 88.02 |
| 4 bar | 18.50 | 15.05 | 13.62 | 176.04 | 140.83 | 107.83 |
| 5 bar | 24.03 | 19.33 | 17.75 | 184.84 | 154.04 | 121.03 |

| | 12.5 wt % Al(fum)(OH) in SC50 | | | | | |
|---|---|---|---|---|---|---|
| | 298K | | 323K | | 348K | |
| | Exp. | Cal. | Exp. | Cal. | Exp. | Cal. |
| 1 bar | 17.09 | 17.32 | 11.74 | 11.53 | 6.68 | 8.10 |
| 2 bar | 24.83 | 25.14 | 17.21 | 18.46 | 11.60 | 13.78 |
| 3 bar | 30.79 | 31.43 | 22.29 | 24.51 | 15.63 | 19.69 |
| 4 bar | 36.34 | 38.12 | 26.96 | 30.77 | 19.74 | 25.40 |
| 5 bar | 42.72 | 45.95 | 31.59 | 36.17 | 23.87 | 30.66 |

Reversibility/Regeneration Studies

Material regeneration is a highly desirable characteristic of materials for use in industrial processes such as separation. The dispersions of Examples 6 and 7 were regenerated by applying vacuum ($8.5 \times 10^{-2}$ bar) for 30 minutes, and their uptake of $CO_2$ measured after the first and second cycles. The results of these studies are shown in FIG. 5. From these, it can be seen that the dispersions of Examples 6 and 7 showed at least 75% $CO_2$ uptake capacity after two cycles of regeneration. However, the same studies on a conventional amine-based solution (12.5 wt. % MEA in $H_2O$) showed almost no regeneration.

Further regeneration studies were performed with 13 wt % HKUST-1 in silicone oil, by applying vacuum (up to $8.5 \times 10^{-2}$ bar) to remove captured $CO_2$. The results, shown in FIG. 6, show that $CO_2$ uptake capacity can be maintained for at least 5 cycles.

Additional regeneration tests were performed with (i) 13 wt % ZIF-8 in sesame oil, (ii) 13 wt % HKUST-1 in silicone oil, (iii) Al(fum)(OH) in olive oil and (iv) Zn-SIFSIX-3 in paraffin oil, by applying vacuum (up to $8.5 \times 10^{-2}$ bar) to remove captured $CO_2$. The results are shown in FIG. 7, and demonstrate that $CO_2$ uptake capacity can be maintained for at least 3 cycles for a variety of porous liquids.

The invention claimed is:

1. A dispersion comprising:
    a porous solid selected from a MOF, zeolite 5A, zeolite Rho, zeolite AgX, zeolite AgA, a covalent organic framework (COF), a Mobil Composition of Matter (MCM) and a porous carbon, dispersed in a liquid phase;
    wherein the liquid phase is selected from the group consisting of, liquid oligomers, liquid polymers, halogenated oils, silicone oil 20 cst, silicone oil 50 cst, silicone oil 350 cst, silicone oil 1000 cst, silicone oil AP 100, silicone oil AR 20, and combinations thereof; and
    wherein the dispersion comprises 0.1-50 wt % of the porous solid.
2. The dispersion as claimed in claim 1, wherein the porous solid is a MOF, the MOF comprising a metal ion co-ordinated to an organic ligand selected from oxalate, carboxylates, imidazoles, sulfonates, phosponates, peptides, carboranes, polyoxymetalates, heterocycles, and derivatives thereof; and mixtures thereof; or to an inorganic anion selected from $SiF_6$, $TiF_6$ and mixtures thereof.

3. The dispersion as claimed in claim 1, wherein the MOF is selected from HKUST-1, ZIF-8, Al(fumarate)(OH), SIFSIX-3-Zn, SIFSIX-3-Cu, UiO-66-NH2, UiO-66, Zr(fumarate), ZIF-67, MOF-5, IRMOF-3, UiO-67, CAU-10, SIFSIX-3-Ni, MIL-53, MIL-101, NOTT-100, PCN-14, SIFSIX-3-Co, ZIF-90, ZIF-7, BIT-101, MOF-74, MOF-177, CuBTTri, IRMOF-3, MOF-5CH$_3$, PCN-222, and UiO-66-CH$_3$.

4. The dispersion as claimed in claim 1, wherein the liquid phase is selected from silicone oil AP 100 and silicone oil AR 20.

5. The dispersion as claimed in claim 1, wherein the liquid phase is a halogenated oil, optionally a fluorinated, brominated or chlorinated oil.

* * * * *